United States Patent [19]
Kasashima et al.

[11] Patent Number: 5,485,073
[45] Date of Patent: Jan. 16, 1996

[54] PERSONAL COMPUTER FOR PERFORMING CHARGE AND SWITCHING CONTROL OF DIFFERENT TYPES OF BATTERY PACKS

[75] Inventors: Masahiko Kasashima; Nobuyuki Nanno; Kouichirou Takeguchi; Kazuo Akashi; Yoshiaki Suzuki; Makoto Ando; Yuji Yamanaka, all of Tokyo, Japan

[73] Assignee: Kabushiki Kaisha Toshiba, Kawasaki, Japan

[21] Appl. No.: 26,219

[22] Filed: Mar. 1, 1993

Related U.S. Application Data

[63] Continuation of Ser. No. 633,358, Dec. 28, 1990, abandoned.

[30] Foreign Application Priority Data

Dec. 28, 1989 [JP] Japan ................................. 1-342415
Jun. 25, 1990 [JP] Japan ................................. 2-166208
Jun. 25, 1990 [JP] Japan ................................. 2-166209

[51] Int. Cl.$^6$ ................................. H01M 10/46
[52] U.S. Cl. ................................. 320/15; 320/30
[58] Field of Search ................................. 320/15, 20, 48, 320/39, 30; 395/750; 364/483

[56] References Cited

U.S. PATENT DOCUMENTS

| | | | |
|---|---|---|---|
| 4,315,162 | 2/1982 | Ferguson | 364/900 |
| 4,388,582 | 6/1983 | Saar et al. | 320/20 |
| 4,577,144 | 3/1986 | Hodgman et al. | 320/2 |
| 4,645,325 | 2/1987 | Inoue et al. | 354/484 |
| 4,746,852 | 5/1988 | Martin | 320/20 |
| 4,766,361 | 8/1988 | Pusateri | 320/2 |
| 4,849,682 | 7/1989 | Bauer et al. | 320/15 |
| 4,908,790 | 3/1990 | Little et al. | 364/900 |
| 4,965,738 | 10/1990 | Bauer et al. | 320/39 X |
| 5,162,721 | 11/1992 | Sato | 320/15 |

FOREIGN PATENT DOCUMENTS

| | | |
|---|---|---|
| 0293664 | 12/1988 | European Pat. Off. . |
| 0340794 | 11/1989 | European Pat. Off. . |
| 0394074 | 10/1990 | European Pat. Off. . |
| 0392857 | 10/1990 | European Pat. Off. . |
| 0404588 | 12/1990 | European Pat. Off. . |
| 582137 | 11/1993 | Japan . |
| 2219151 | 11/1989 | United Kingdom . |

*Primary Examiner*—Peter S. Wong
*Assistant Examiner*—Edward Tso
*Attorney, Agent, or Firm*—Cushman, Darby & Cushman

[57] ABSTRACT

A personal computer of this invention has a battery pack mounting section for detachably receiving battery packs having different current capacities. The personal computer also includes a switch mechanism for detecting whether a battery pack has a high or low capacity. Battery characteristic values consisting of charge and discharge voltage/current characteristics in units of batteries are prestored in a memory in a power control CPU (PC-CPU). The PC-CPU refers to the memory on the basis of capacity data from the switch mechanism and reads out the corresponding battery characteristic data. A power supply circuit performs optimal charge control on the basis of this characteristic data. Two battery packs are prepared. When the PC-CPU detects that the currently used battery pack is in a low-battery state, it selects the other battery pack to supply the operating power to the personal computer. At the same time the PC-CPU performs optimal charge control of the battery in the low-battery state.

19 Claims, 16 Drawing Sheets

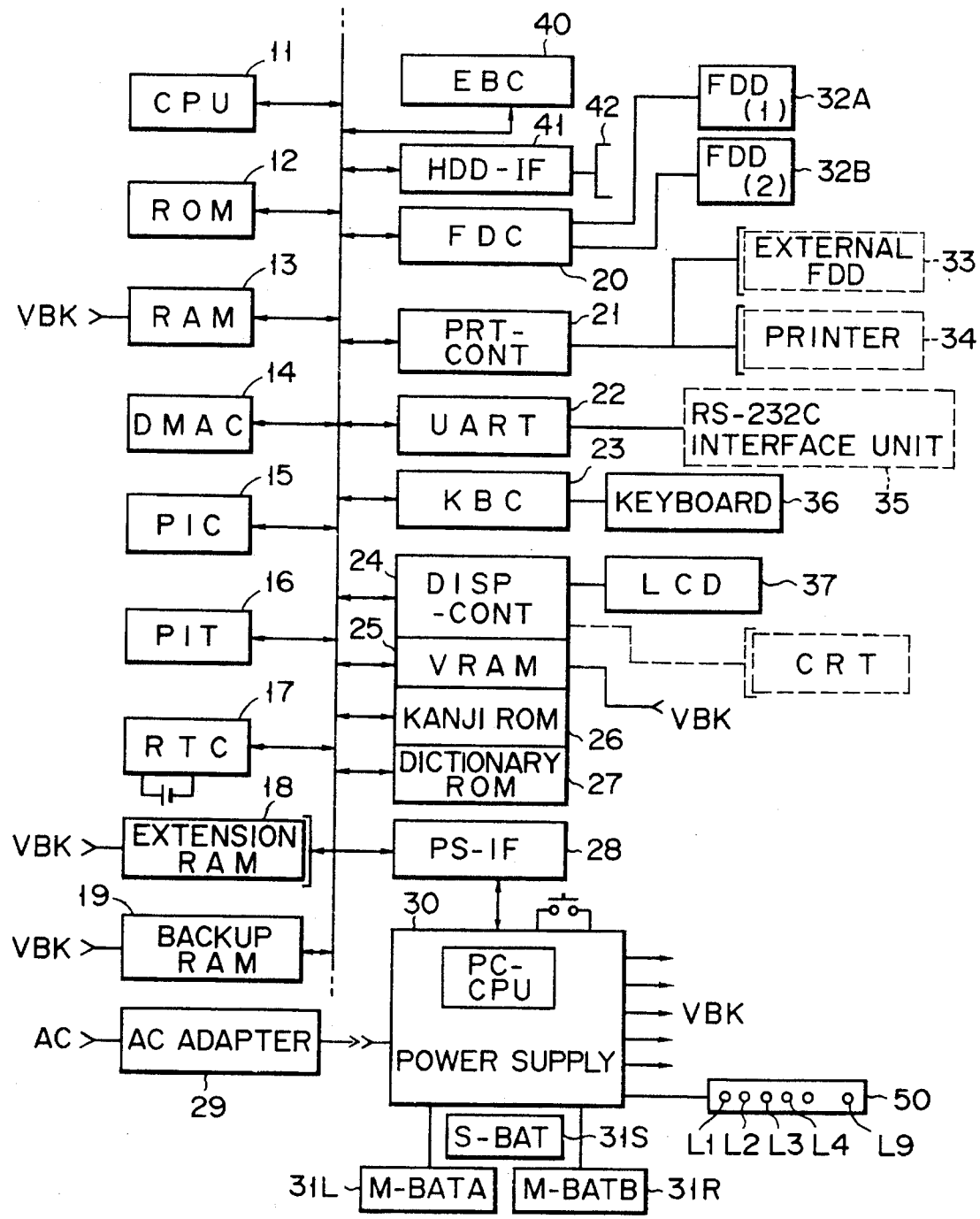
F I G. 1

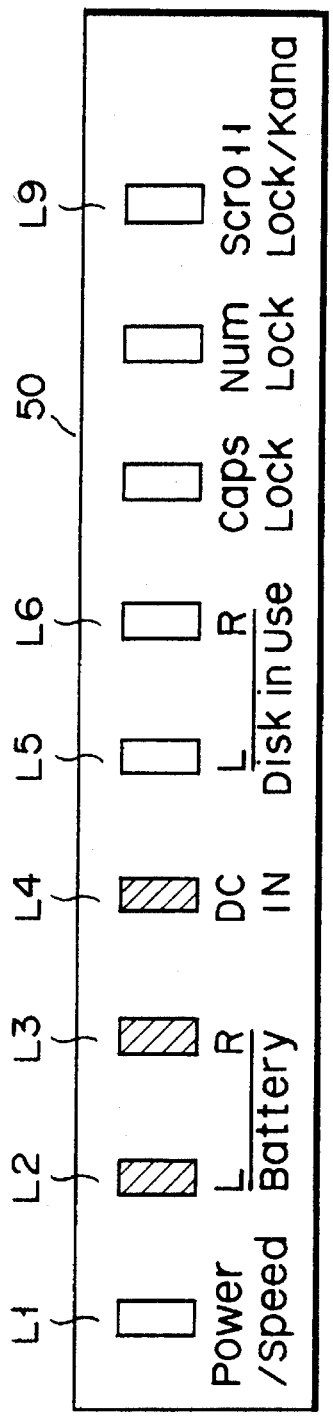

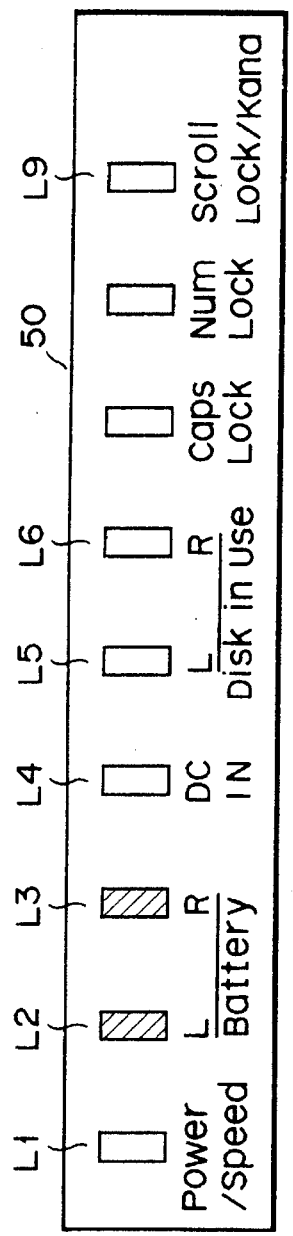

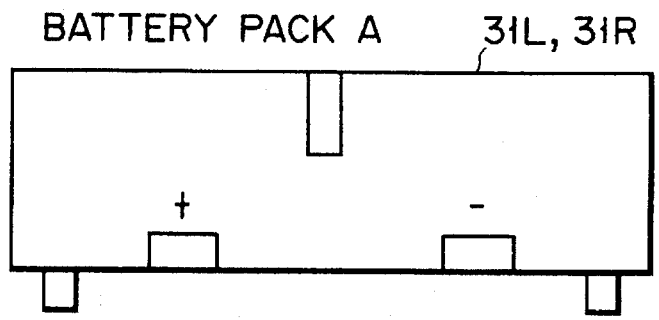
F I G. 7A
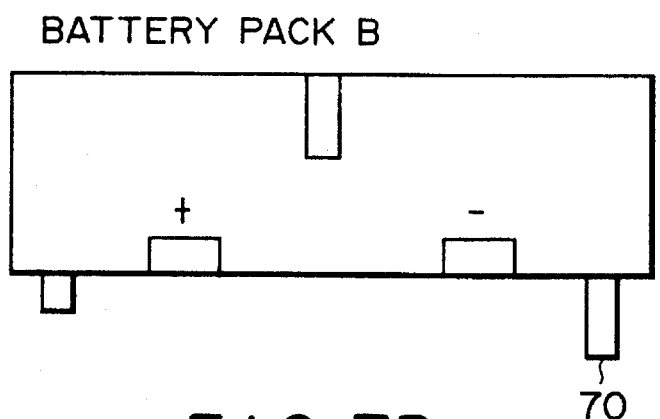
F I G. 7B
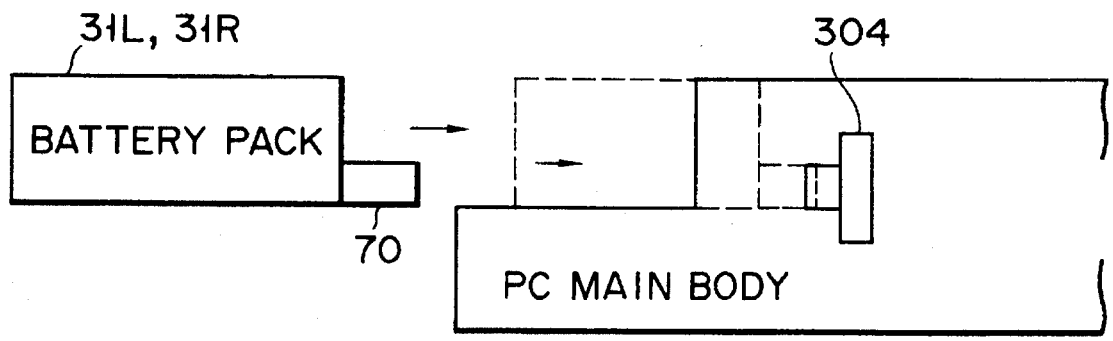
F I G. 7C

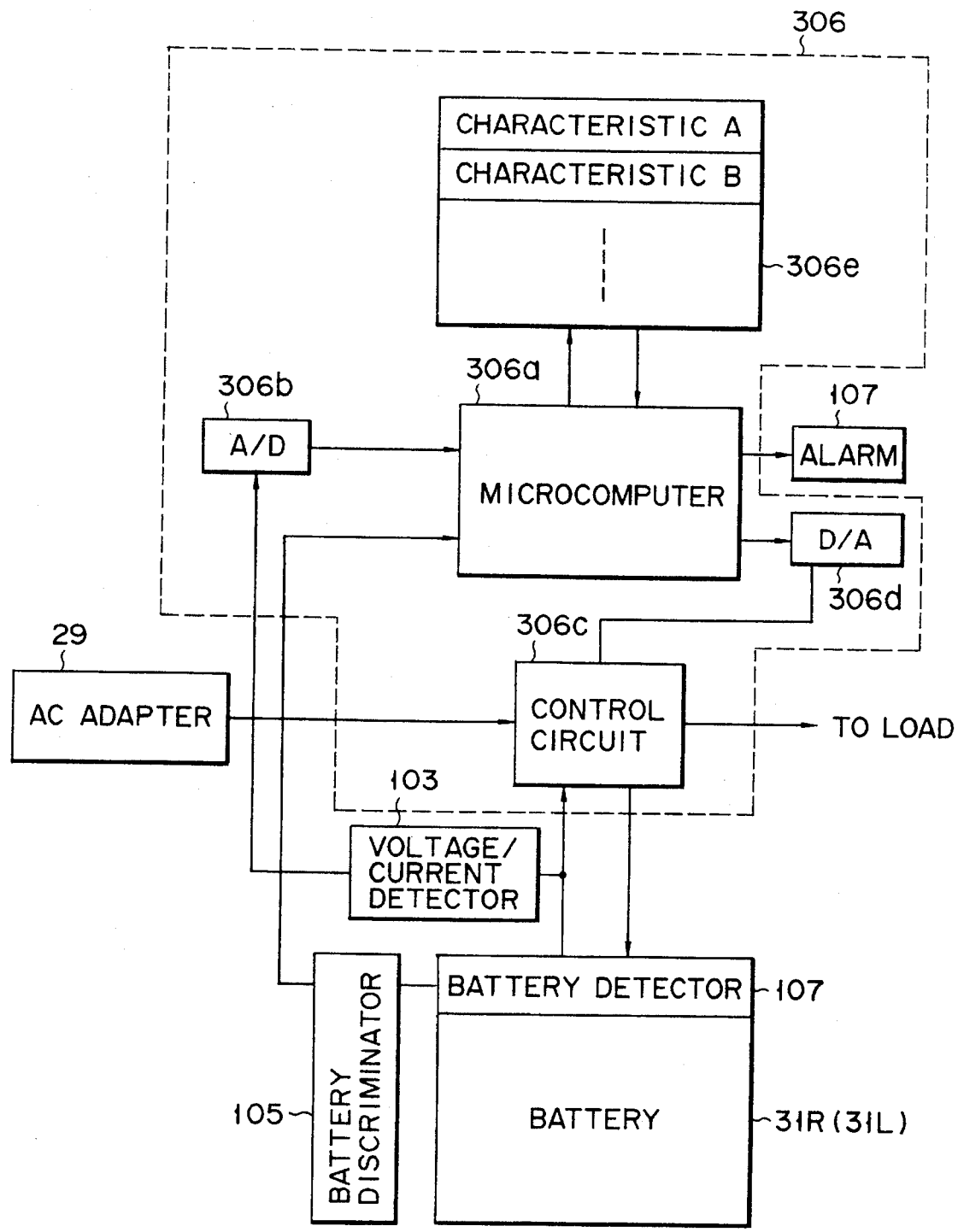
F I G. 9

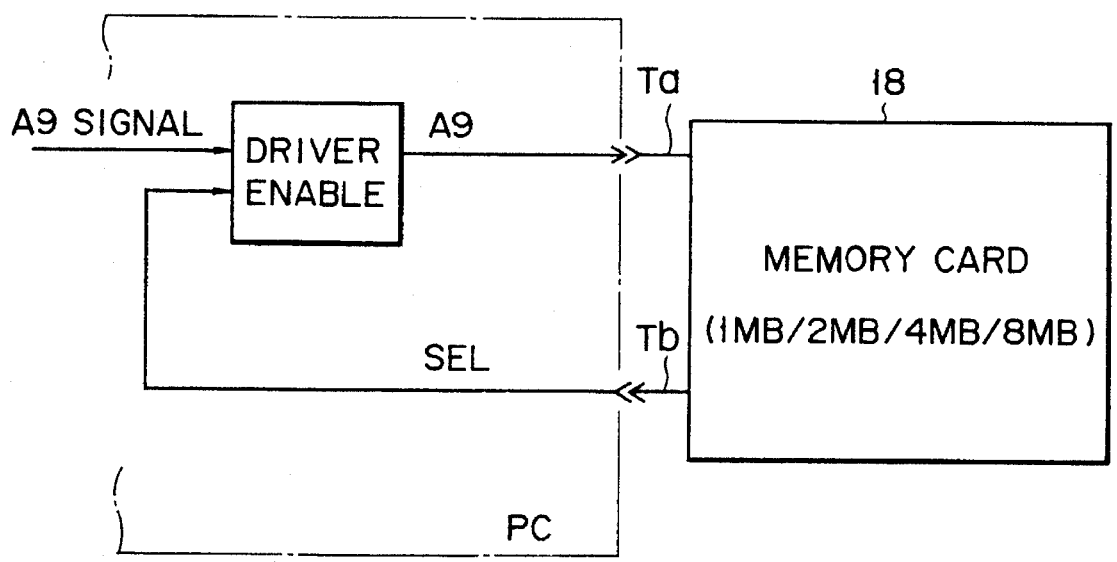
F I G. 10
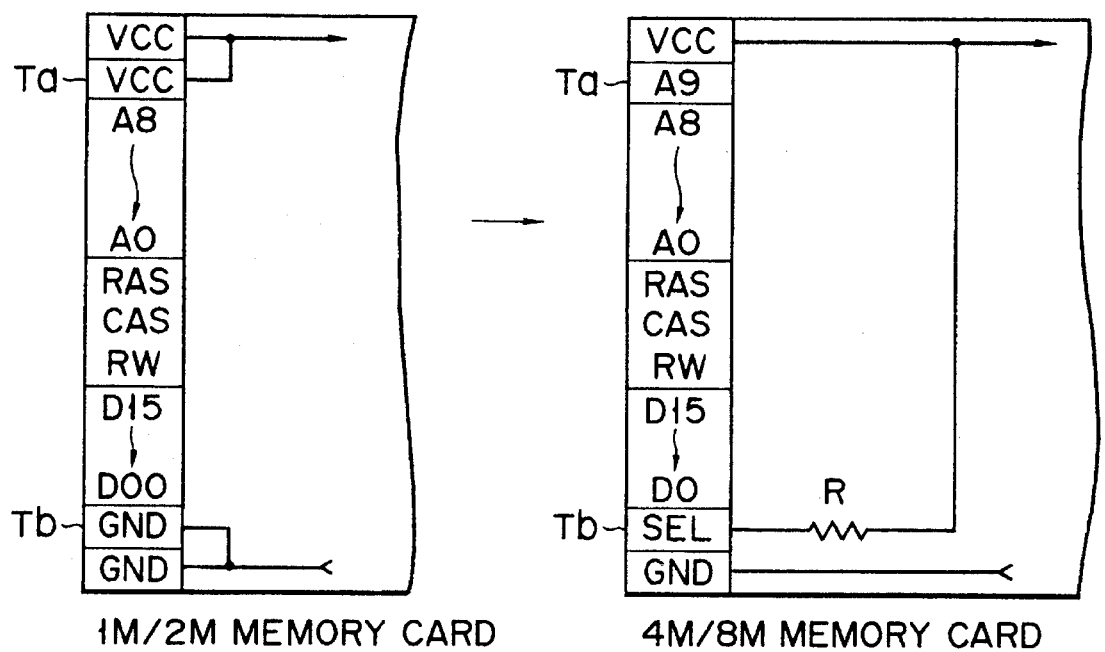
F I G. 11A    F I G. 11B

```
Remaining Battery capacity
 <LEFT> : E  ???  F   <RIGHT> :  E  ???  F
 Speaker :  ON  OFF   Mode :   RESUME  BOOT
 Audible Battery warning :  ON  OFF
```

E    ???    F ··· BATTERY MOUNT INITIAL STATE

E    N/A    F ··· BATTERY UNMOUNTED STATE

E   ▶▶▷▷  F ··· BATTERY RESIDUAL CAPACITY DISPLAY

FIG. 15

PERSONAL COMPUTER FOR PERFORMING CHARGE AND SWITCHING CONTROL OF DIFFERENT TYPES OF BATTERY PACKS

This is a continuation of application Ser. No. 07/633,358, filed on Dec. 28, 1990, which was abandoned upon the filing hereof.

BACKGROUND OF THE INVENTION

1. Field of the Invention

The present invention relates to a personal computer for performing charge control of batteries having different capacities and switching control of a plurality of battery packs.

2. Description of the Related Art

In recent years, various types of portable, battery-driven personal computers have been developed. When such a personal computer is used with an AC adapter or a built-in battery, an operating power supply state must always be monitored, and all failures caused by abnormal power supply states must be eliminated.

A battery pack having a plurality of units each consisting of a primary battery (dry battery) and a secondary battery (rechargeable battery) is employed as a power supply for driving a lap-top computer or the like. When a battery is used as a power supply, in order to assure an operation of electronic equipment, the power level of the battery must be detected to perform battery replacement control and battery charge control for charging timings of the battery. A terminal voltage, a charge current, or discharge current of the battery is detected, the detected value is compared with a rated value of the battery, and battery charge control is performed on the basis of the comparison result. These control operations, however, are realized by a circuit entirely constituted by hardware.

Since charge control is performed by only hardware, batteries used must be limited to a specific type of battery. The rated value of the battery must be a fixed value based on the battery characteristics. When batteries having different charge and discharge characteristics are used, charge control, remaining battery capacity computation, and low-battery detection cannot be accurately performed. Charge control corresponding to types of batteries cannot be performed. For example, when a nickel-hydrogen battery compatible with a nickel-cadmium battery and having a larger capacity than the nickel-cadmium battery is to be used in electronic equipment having a characteristic value of the nickel-cadmium battery, charging and discharging of the nickel-hydrogen battery are controlled on the basis of the characteristic value of the nickel-cadmium battery, and the performance of the nickel-hydrogen battery cannot be sufficiently maximized.

A relatively inexpensive low-capacity battery and a relatively expensive high-capacity battery cannot be selectively used in such systems. When charge control is performed in accordance with the types of batteries, a circuit arrangement constituted by only hardware is undesirably complicated.

A power supply controller monitors a voltage of a battery used to supply power. When the monitored battery voltage is lowered to a voltage which does not allow supply of enough power to operate a computer, this battery is determined to have a low-battery state. When the battery voltage reaches a predetermined voltage slightly higher than a voltage corresponding to the low-battery state, an alarm is generated to signal a low battery voltage level to a user.

When a battery in the low-battery state is slightly charged, a conventional power supply controller determines that the slightly charged battery is not set in a low-battery state, thereby performing power supply control of the battery.

when the battery in the low-battery state is, however, used upon slight charging, the battery voltage is abruptly lowered, and the battery is set soon in the low-battery state. Therefore, the computer power supply is cut off without generating the alarm. In a computer having a resume function, the computer is powered off before resume processing is completed. Therefore, the resume function cannot be sufficiently utilized.

SUMMARY OF THE INVENTION

It is an object of the present invention to provide a portable personal computer wherein when two types of battery packs, i.e., high- and low-capacity battery packs; are to be used; charge control; remaining battery capacity computation, and low-battery detection can be performed in accordance with the different types of battery packs; and when two battery packs can be mounted and are used for a long period of time, automatic switching of the battery packs and their charge control can be performed to always maintain a stable battery power supply state and ensure highly reliable battery-driven processing operations.

According to a first aspect of the present invention, a personal computer comprises: data storage means; data processing means; a battery pack storage section for storing any of battery packs having different current capacities; means for detecting a current capacity of a battery pack stored in the battery pack storage section; means for charging the stored battery pack on the basis of the current capacity detected by the detecting means; and means for generating an operating power from the battery pack stored in the battery pack storage means.

According to a second aspect of the present invention, a personal computer comprises: data storage means; data processing means; at least two battery pack storage sections for respectively storing at least two battery packs; means for detecting each of current capacities of the battery packs stored in the plurality of battery pack storage sections; means for performing charge control of the battery packs on the basis of the current capacities detected by the detecting means; means for selecting one of the plurality of battery packs; and means for generating an operating power from the selected battery pack.

According to a third aspect of the present invention, a charge control system comprises: a battery mounting section capable of receiving different types of batteries; means for determining types of batteries mounted in the mounting section; storage means for prestoring characteristic values of the different types of batteries; and charge control means for reading out the battery characteristic values from the storage means on the basis of the batteries determined by the determining means and for performing battery charge control on the basis of the readout characteristic values.

According to the present invention, a battery pack mounted in a battery pack mounting section can be charged at high speed in optimal conditions. Therefore, the battery power supply state is always kept stable, and highly reliable battery-driven processing operations can be ensured.

When a pair of battery packs is used as first and second main batteries in units of packs, the battery pack serving as the main battery can be controlled at high speed in optimal conditions. The battery power supply state is always kept stable, and highly reliable battery-driven processing operations can be ensured.

When charge control of batteries having different characteristics is performed in accordance with types of batteries, the capabilities of the batteries can be sufficiently enhanced. Therefore, the batteries having different current capacities can be fully charged within the same charge time.

Additional objects and advantages of the invention will be set forth in the description which follows, and in part will be understandable from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate a presently preferred embodiment of the invention, and together with the general description given above and the detailed description of the preferred embodiment given below, serve to explain the principles of the invention.

FIG. 1 is a block diagram showing an embodiment of a personal computer according to the present invention;

FIGS. 5A and 5B are views for explaining display contents of a state display unit in accordance with charge control shown in FIG. 3;

FIGS. 6A through 6C are views for explaining display contents of the state display unit in accordance with battery-driven control shown in FIGS. 4A through 4C;

FIGS. 7A through 7C are views for explaining a type determination mechanism of a mounted battery pack;

FIG. 9 is a block diagram showing an embodiment wherein the capacity of a mounted battery pack is detected, and battery pack charge current control is performed using a charge control parameter corresponding to the detected capacity type;

FIGS. 10, 11A, and 11B are views for explaining an interface mechanism of a memory card used as an extension RAM in the above embodiment;

FIG. 15 is a view showing a bottom-up menu for displaying a battery state in the above embodiment.

DETAILED DESCRIPTION OF THE PREFERRED EMBODIMENTS

Figure 2:
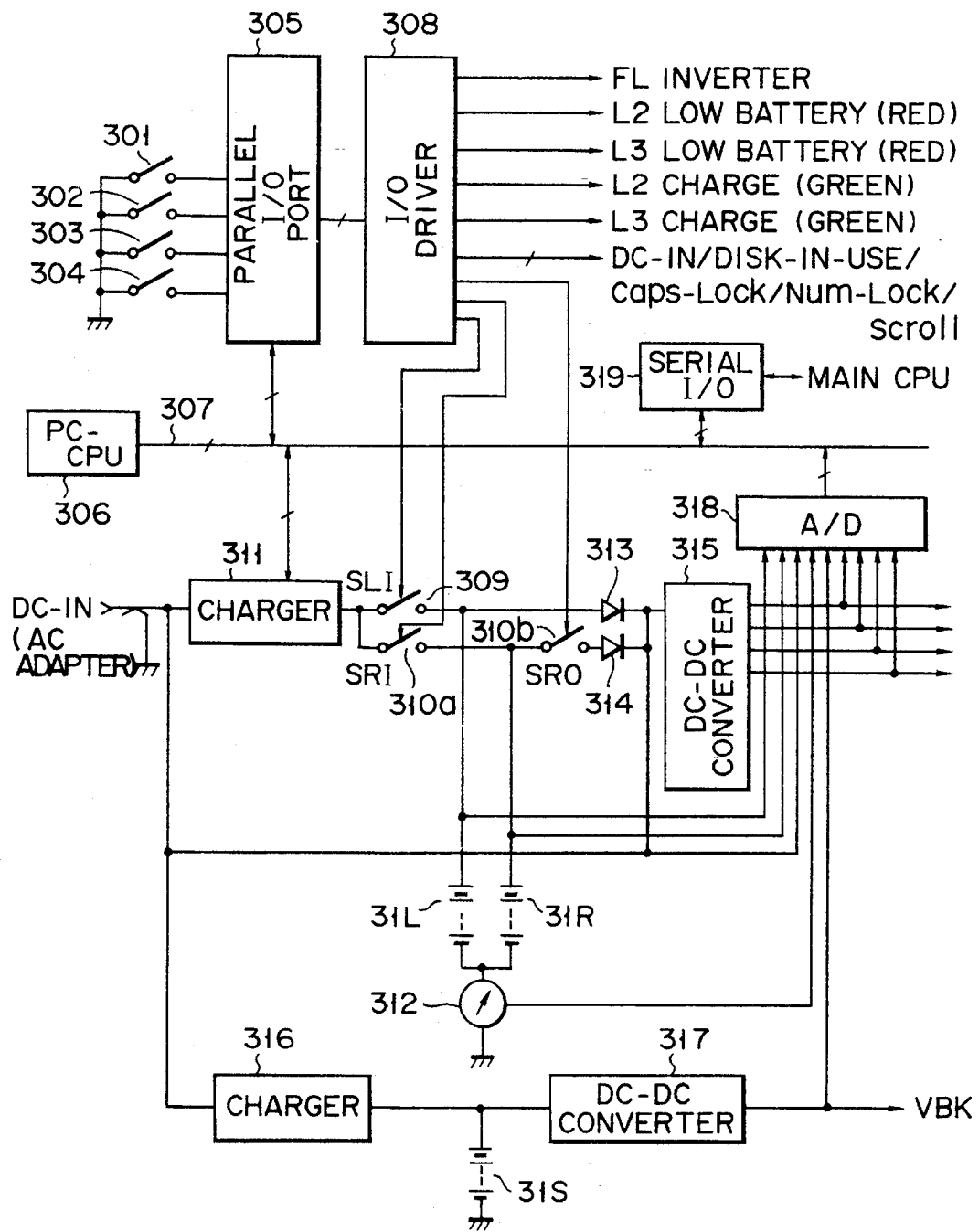
FIG. 2 is a block diagram showing an arrangement of a power supply circuit shown in FIG. 1.

FIG. 1 is a block diagram showing an embodiment of a personal computer according to the present invention. Referring to FIG. 1, components 11 through 30 and 40 are connected to a system bus 10. A CPU (main CPU) 11 controls the overall operation of the system. A ROM 12 stores permanent programs such as firmware. A RAM 13 serves as a main memory and stores programs and data to be processed. A direct memory access controller (DMAC) 14 performs direct memory access control. A programmable interrupt controller (PIC) 15 and a programmable interval timer (PIT) can be set by programs. A real time clock (RTC) 17 has its own operating battery. An extension RAM 18 serves as a high-capacity extension RAM to be detachably inserted in an extension RAM card slot. In this embodiment, any four types of memory cards, i.e., 4- and 8-MB new memory cards in addition to 1- and 2-MB existing memory cards, can be mounted. In this case, a common interface mechanism for the existing memory cards (1 MB and 2 MB) and the new memory cards (4 MB and 8 MB) will be described later with reference to FIGS. 9 and 10.

A backup RAM 19 serves as a data storage area for realizing a resume function and is powered by a backup power (VBK). A floppy disk controller (FDC) 20 is arranged to control two floppy disk drives FDD(1) 32A and FDD(2) 32B. However, for example, a 2.5" hard disk may be mounted in place of the FDD(2) 32B, and the system can be easily upgraded. In this case, a means for replacing the FDD+FDD arrangement with the HDD+FDD arrangement will be described later with reference to FIGS. 12 through 14C.

A printer controller (PRT-CONT) 21 is selectively connected to an external floppy disk drive 33 or a printer 34 through a connector. An input/output interface (Universal Asynchronous Receiver/Transmitter: UART) 22 is connected to an RS-232C interface 35 or the like as needed. A keyboard controller (KBC) 23 controls inputs to a keyboard 36 integrally arranged with an apparatus main body having a CPU board therein. A display controller (DISP-CONT) 24 drives only an LCD 37 with a side light consisting of an FL (fluorescent light) cold cathode ray tube. However, the DISP-CONT 24 may control a CRT display unit as an external display. A video RAM (VRAM) 25 is powered by the backup power (VBK) and stores video data. A kanji ROM 26 stores kanji character patterns corresponding to kanji character codes. A dictionary ROM 27 stores a kana/kanji conversion dictionary.

A power supply control interface (PS-IF) 28 is arranged to connect a power supply circuit (FIG. 2) 30 to the CPU 11 through the system bus 10. In this embodiment, the PS-IF 28 has a serial-parallel conversion function for performing data transfer by means of a serial interface between the power supply circuit 30 and the power control CPU 306 in this embodiment. A power supply adapter (to be referred to as an AC adapter) 29 is plug-in connected to the personal computer main body and rectifies and smoothes a commercial AC power (AC) to obtain a DC operating power having a predetermined potential. An intelligent power supply (to be referred to as a power supply circuit hereinafter) has the power control CPU (PC-CPU) and has an arrangement to be described with reference to FIG. 2.

Main batteries (M-BATA and M-BATB) 31L and 31R are detachable from the apparatus main body (PC main body) and are respectively constituted by rechargeable batteries. In this embodiment, during an operation, one of the batteries is selected as a target object (target power supply object) under the control of the power supply circuit 30. When the selected battery is discharged to a use limit, the target power supply object is switched, and the other battery serves as a target power supply object. In this embodiment, of the pair of main batteries (M-BATA and M-BATB) 31L and 31R, the battery (M-BATA) 31L is called a left main battery (L-battery), and the battery (M-BATB) 31R is called a right main battery (R-battery). In this case, main batteries having different capacities (i.e., 2200-mA type and 1700-mA type), and one of the batteries can be arbitrarily used. A charge control processing means for these main batteries (M-BATA and M-BATB) 31L and 31R will be described with reference to FIG. 3, and a selecting/switching processing means including a battery check during operation with a battery will be described later with reference to FIGS. 4A through 4C. The charge control state display will be described later with reference to FIGS. 5A and 5B, and the battery use state display and the state transition display will be described with reference to FIG. 6. At least one of the pair of main batteries (M-BATA and M-BATB) 31L and 31R is used as a detachable battery, battery packs serving as main batteries have two different current capacities, and any one of the battery packs can be mounted. Under these conditions, a mounted battery pack type determining mechanism and a charge processing means based on the determined battery type will be described later with reference to FIGS. 7A through 8.

A sub-battery (S-BAT) 31S is a rechargeable built-in battery which supplies a backup power (VBK) required for backing up the RAM 13, the extension RAM 18, and the video RAM 25.

An extension bus connector 40 is an extension bus connector (EBC) for extending the functions. The EBC 40 is selectively connected to, e.g., an external hard disk (external HDD) as needed, or to any other extension unit having a function extension component (e.g., a keyboard, a CRT display, a high-capacity memory, and a personal computer mounting mechanism) to form a circuit.

A built-in HDD interface (HDD-IF) 41 interfaces a built-in HDD (with HDC) when the system is upgraded to an HDD mounted type (i.e., one HDD and one FDD are mounted). More specifically, when the system is to be upgraded, a built-up HDD is connected through a connector 42 in place of the floppy disk drive (FDD(2)) 32B. In this case, a means for upgrading the system from the FDD+FDD type having two floppy disk drives (FDD(1) and FDD(2)) 32A and 32B to the HDD+FDD arrangement consisting of one 2.5" hard disk (HDD) and a 3.5" floppy disk drive will be described with reference to FIGS. 12 through 14C.

A state display unit 50 consists of a plurality of sate display LEDs (L1 to L9) driven under the control of the power control CPU 306 in the power supply circuit 30 and the details of this state display unit are shown in FIGS. 5A through 6C.

FIG. 2 is a block diagram showing an arrangement of the power supply circuit 30. The power supply circuit 30 includes a power switch 301, a reset switch 302, and a display switch 303. A switch 304 is used to set the capacity (2200-mA type or 1700-mA type) of the main battery (31L/31R) and is turned on to use the main battery (31L or 31R) having a larger capacity (2200 mA). A method of setting this switch 304 will be described in detail with reference to FIGS. 7A through 7C. A parallel I/O port 305 holds states of the switches 301, 302, 303, and 304 and setup information of the power control CPU 306 (to be described in detail later).

The power control CPU (PC-CPU) 306 concentratedly manages the power supply of the overall apparatus. More specifically, the CPU 306 receives data of the respective components of the power supply circuit 30 instruction data of the CPU 11 through the internal bus 307 and controls power supply to the respective components in the apparatus in accordance with the instructions, internal states, and external operation states. The power control CPU 306 has a power supply control processing function including charge control of the left and right main batteries (M-BATA and M-BATB) 31L and 31R by using charge setup data (charge control parameter) shown in the flow chart of FIG. 3 and battery drive control in accordance with the flow charts in FIGS. 4A through 4C.

An I/O driver 308 controls FL (fluorescent light) of the LCD 37 under the control of the power control CPU 306 and drives the LEDs (L1 through L9) of the state display unit 50.

As shown in FIGS. 5A and 5B and FIGS. 6A through 6C, the state display unit 50 consists of nine LEDs (L1 through L9) including a power ON state and operating speed set state display LED (L1), a state display LED (L2) for the left main battery (M-BATA) 31L, a state display LED (L3) for the right main battery (M-BATB) 31R, an AC adapter connecting state display LED (L4), a use state display LED (L5) for the floppy disk drive (FDD(1)) 32A, and a use state display LED (L6) for the floppy disk drive (FDD(2)) 32B. Each LED can emit red light and green light. Red light or green light, or both the green light and the red light are selectively emitted to perform display operations in units of colors. More specifically, the LED (L1) emits green light in a high-speed clock operation in a power ON state, but emits red light in a low-speed clock operation. The LEDs (L2 and L3) flickers red light when the corresponding main batteries (M-BATA and M-BATB) 31L and 31R are set in a low-battery state (i.e., a discharge state near a use limit), emit yellow light (red+green) in an abrupt charging state, and emit green light at the end of charging. The LED (L4) emits red light in an effective connecting state of the AC adapter 29 and flickers red light in the effective connecting state of the AC adapter 29 in an abnormal state of the power supply circuit 30.

A main battery switch (SL1) 309 is inserted in a current path of the left main battery (M-BATA) 31L and is ON/OFF-controlled by an output from the I/O driver 308 controlled by the power control CPU 306. Main battery switches (SR1 and SR0) 310a and 310b are inserted in a current supply path and a current output path of the right main battery (M-BATB) 31R, respectively, and is ON/OFF-controlled by an output from the I/O driver 308. A charge unit 311 charges main batteries (M-BATA and M-BATB) 31L and 31R under the control of the power control CPU 306. A current detector 312 detects output currents from the main batteries (M-BATA and M-BATB) 31L and 31R. Diodes 313 and 314 serve as reverse flow preventive diodes inserted in the current output paths of the main batteries (M-BATA and M-BATB) 31L and 31R. A DC-DC converter 315 generates operating powers for the respective components of the apparatus from the power source of the left main battery (M-BATA) through the main battery switch 309 or the right main battery (M-BATB) 31R through the main battery switches 310a and 310b. A charge unit 316 charges the sub-battery (S-BAT) 31S. A DC-DC converter 317 obtains a backup power (VBK) from a power supply of the sub-battery (S-BAT). In other words, since the left and right main batteries 31L and 31R are detachable, the backup power is supplied from the sub-battery (S-BAT) 31S to prevent erasure of the contents of the backup RAM 19 when both main batteries are detached from the main body. An A/D converter 318 supplies a detection current value of the current detector 312, the output voltages from the main batteries (M-BATA and M-BATB) 31L and 31R, and the output voltages from the DC-DC converters 315 and 317 to the power control CPU 306 as digital data. A serial I/O 319 exchanges data between the power control CPU 306 and the main CPU 11. More specifically, the I/O 319 converts data from the power control CPU 306 into serial data and supplies the digital data to the power supply control interface (PS-IF) 28. This serial data is reconverted into parallel data by the power supply control interface (PS-IF), and the parallel data is sent to the main CPU 11.

Figure 3:
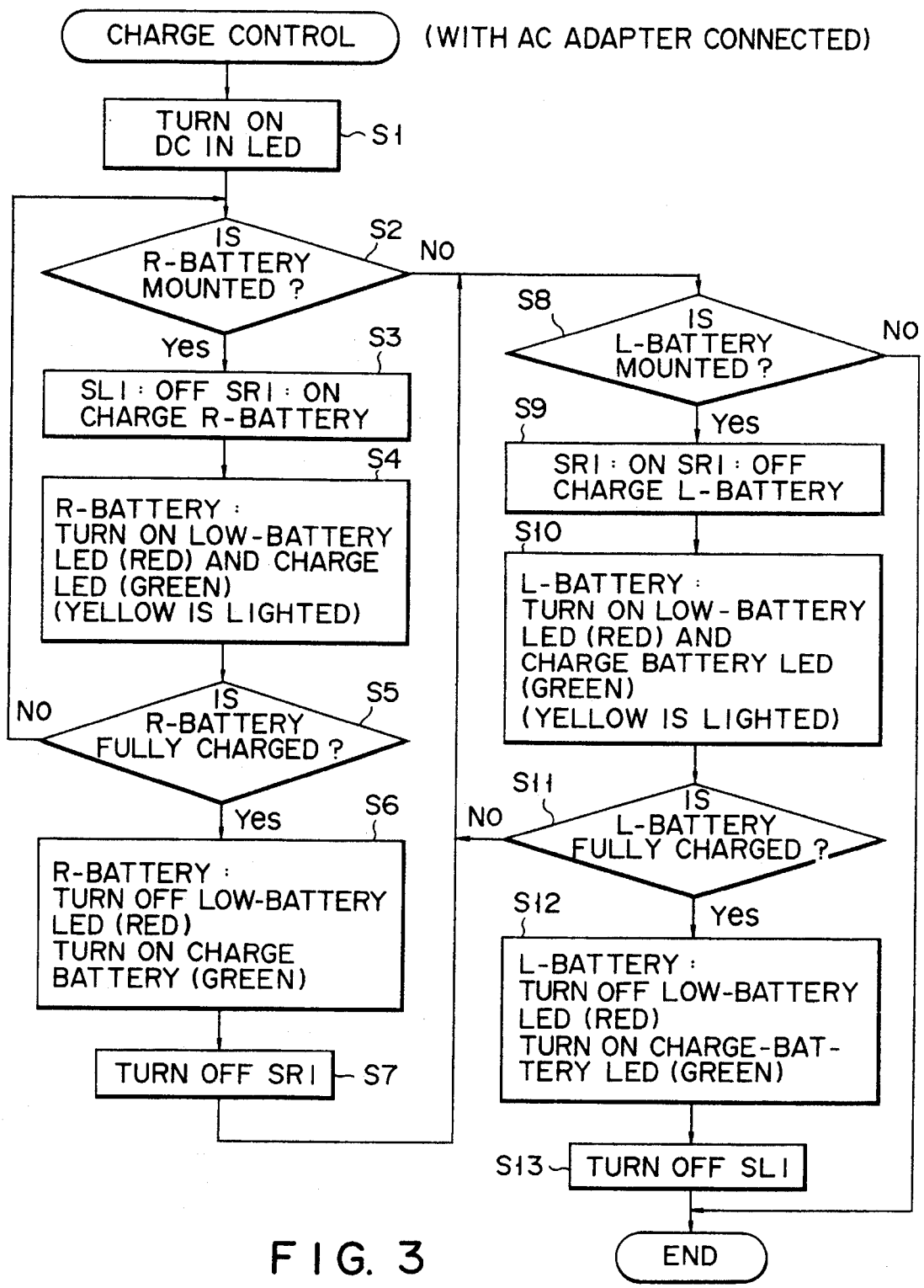
FIG. 3 is a flow chart of a charge control routine executed by a power control CPU 306 shown in FIG. 2.
Figure 4A:
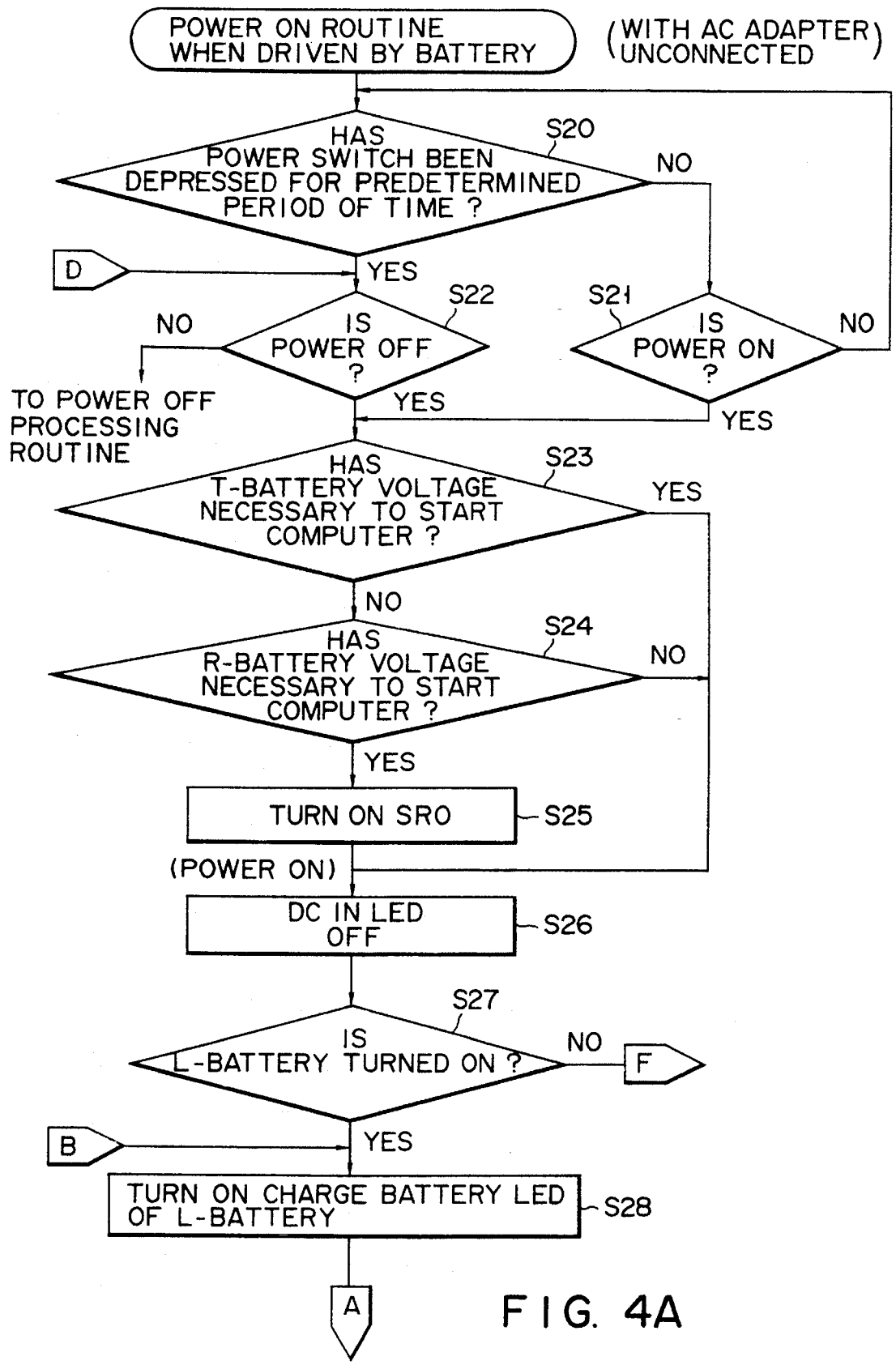
FIGS. 4A through 4C are flow charts of a battery-driven power-on routine executed by the power control CPU 306 shown in FIG. 2.
Figure 4B:
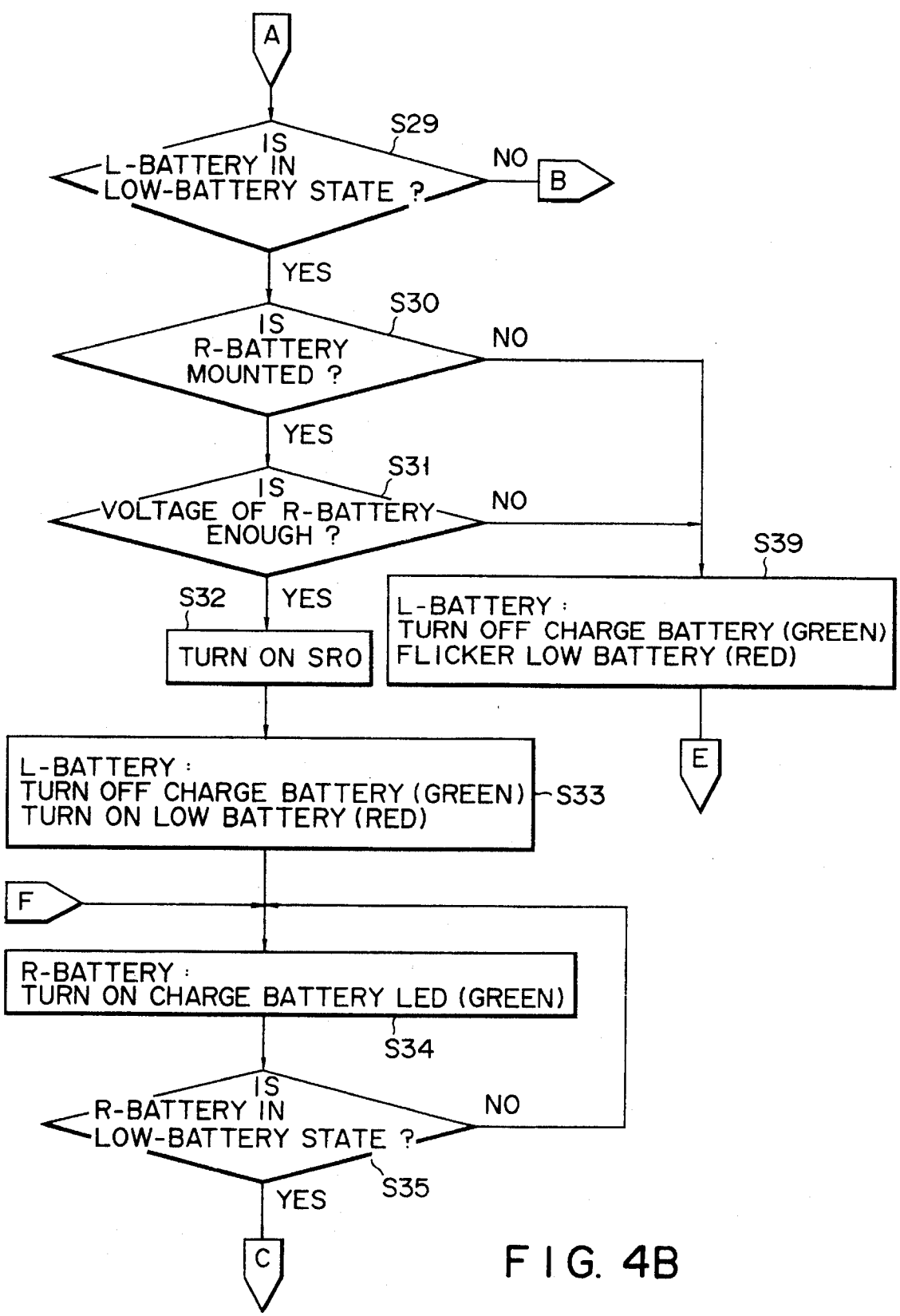
Figure 4C:
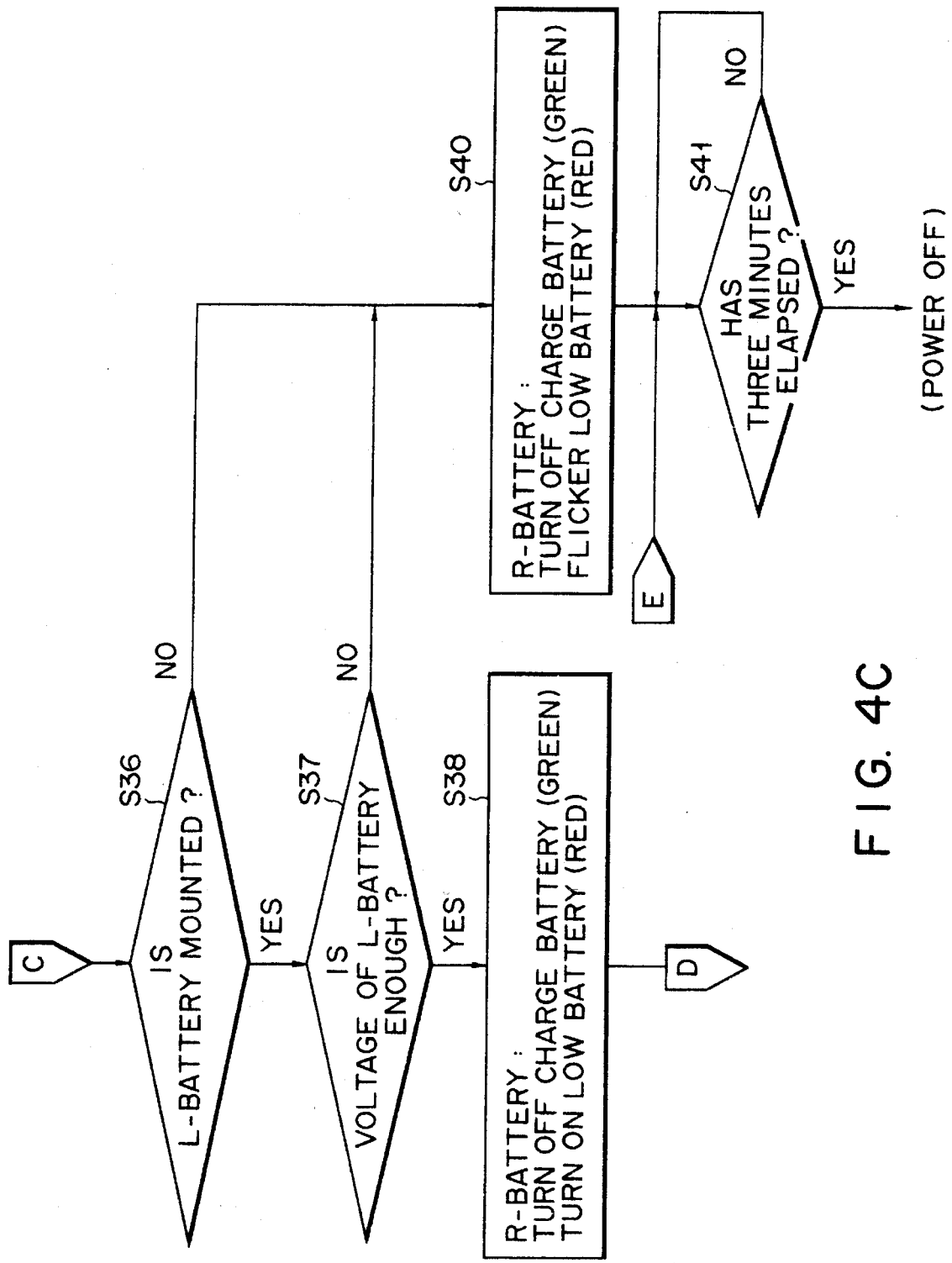

FIGS. 3 and 4A through 4C are flow charts showing processing of the power control CPU 306. FIG. 3 is a flow chart showing a charge control routine in the embodiment of the present invention under the control of the power control CPU 306. This charge control processing is repeatedly performed every predetermined time interval (e.g., 64 msec) when the power control CPU 306 detects the connecting state of the AC adapter 29 through the A/D converter 318. FIGS. 4A through 4C are flow charts showing power ON processing routine when the apparatus is driven by a battery (i.e., an operation performed when the AC adapter is not connected) under the control of the power control CPU 306. This power ON processing routine is repeated every predetermined time interval in a battery-driven power ON state.

FIGS. 5A and 5B are views showing display contents of the state display unit 50 in association with charge control shown in FIG. 3. A relationship between the display contents and display colors of the state display LED (L2) for the left main battery (M-BATA) 311, the state display LED (L3) for the right main battery (M-BATB) 31R, and the AC adapter connecting state display LED (L4) under the charge control in which an external power is supplied from an AC adapter is shown in FIGS. 5A and 5B.

FIGS. 6A through 6C are views showing display contents of the state display unit 50 in association with battery-driven control shown in FIGS. 4A through 4C. These display contents of use states and state transition states are those of the LEDs (L2 through L4) which are obtained when an external power is not supplied from the AC adapter and one of the main batteries (M-BATA and M-BATB) 31L and 31R is selected to obtain a battery-driven state. In this embodiment, the right main battery is preferentially used. However, when the right main battery is set in a low-battery state or when the right main battery is not mounted, the left main battery is used.

Figure 8:
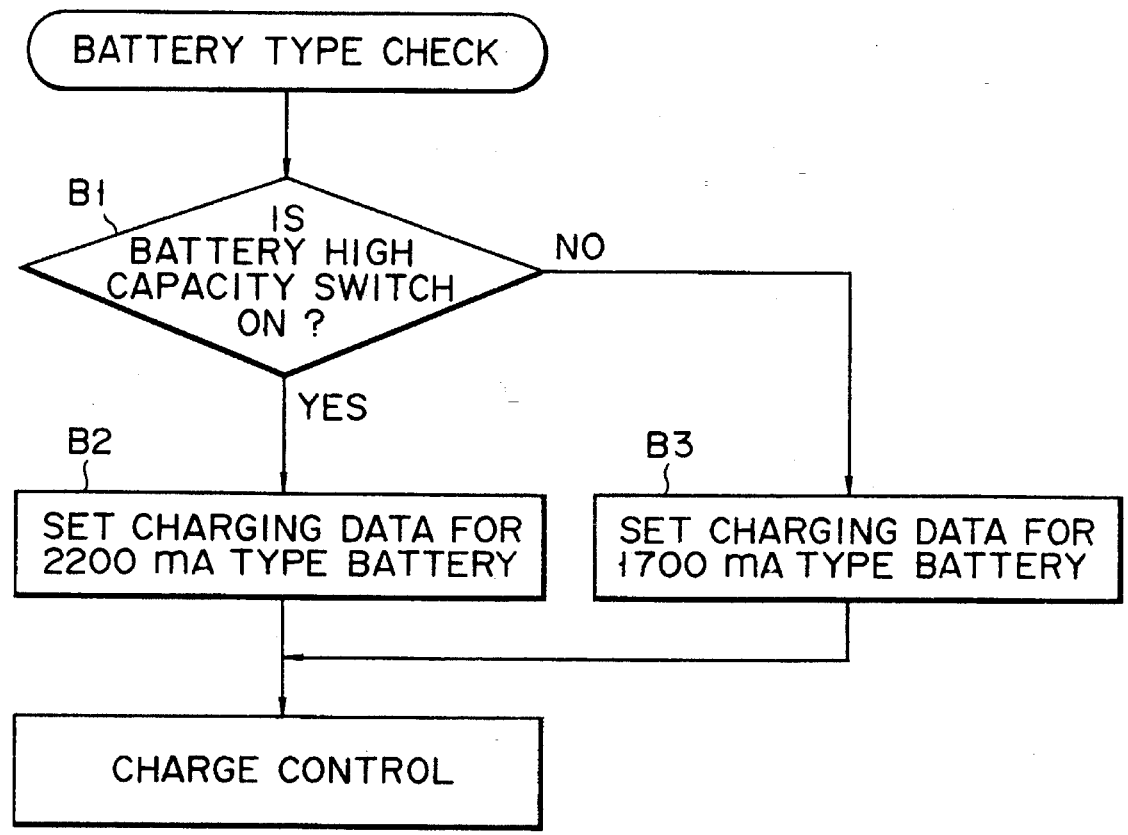
FIG. 8 is a flow chart showing a processing sequence of the power control CPU on the basis of the type determination in FIG. 7.
Figure 12:
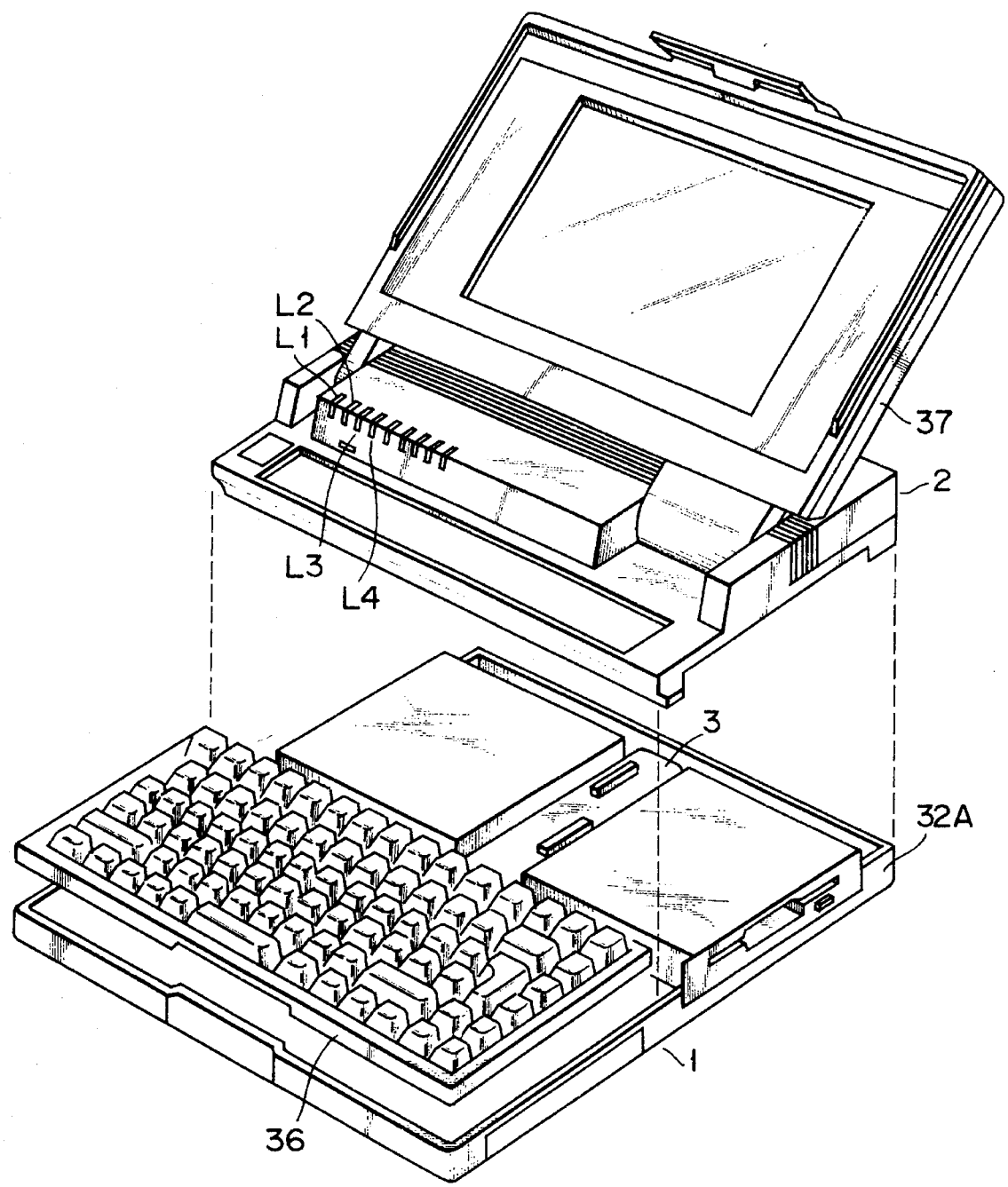
FIGS. 12 and 13 and FIGS. 14A to 14D are views for explaining a system grade-up means using a built-in HDD interface (HDD-IF) in the above embodiment.
Figure 13:
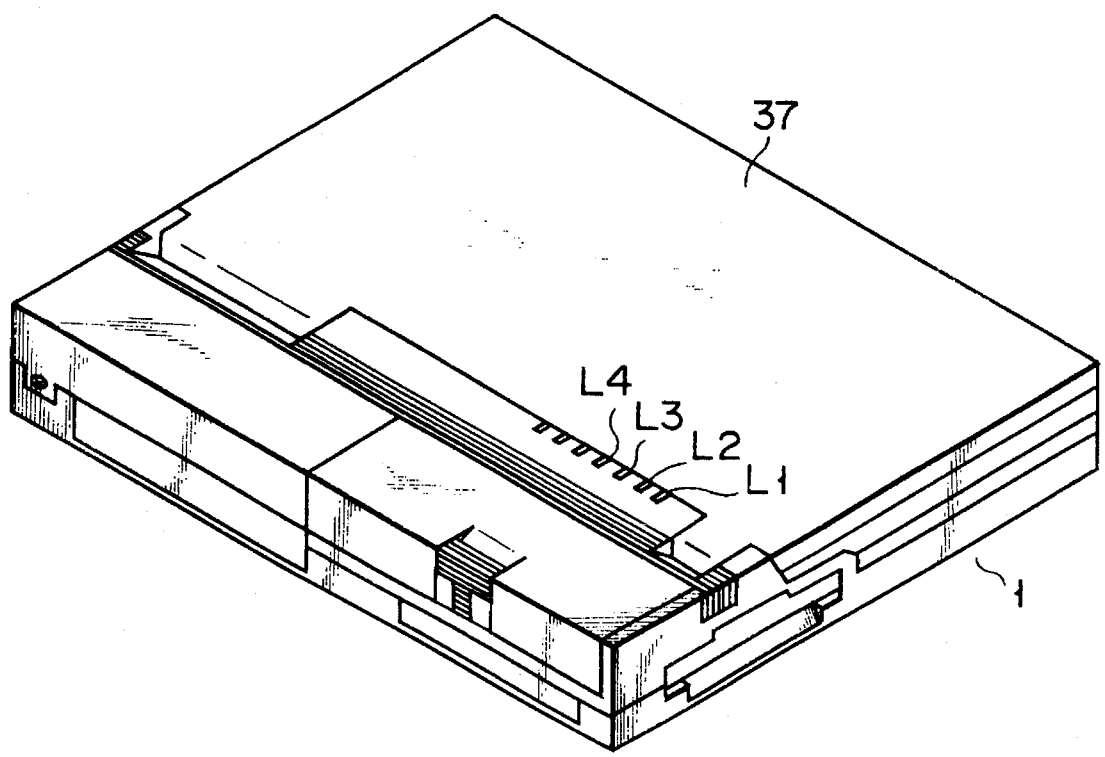

FIGS. 7A through 7C show an arrangement in which one of the main batteries (M-BATA and M-BATB) 31L and 31R is semi-fixed by a screw (in this case, the left main battery (M-BATA) 31L), the right main battery (M-BATB) 31R is slidably detachable by a slidable mounting means, and battery packs having two different current capacities (2200-mA high-capacity type and 1700-mA low-capacity type) can be arbitrarily used, so as to explain a type (capacity type) determination mechanism of the detachable battery pack (right main battery (M-BATB) 31R). FIG. 8 shows a set data (charge control parameter) switching processing flow of the power control CPU 306 by using a battery high capacity switch 304. In this case, the switch 304 is used to set the capacity of the semi-fixed battery pack (left main battery (M-BATA) 31L).

In this embodiment, of the pair of main batteries (M-BATA and M-BATB) 31L and 31R, one main battery (in this case, the left main battery (M-BATA) 31L) is semi-fixed by a screw, and the other battery (i.e., the right main battery (M-BATB) 31R) is arbitrarily detachable by the sliding mounting means. As shown in FIGS. 7A and 7B, the main batteries (M-BATA and M-BATB) 31L and 31R are constituted by battery packs having two different current capacities (2200-mA high-capacity type and 1700-mA low-capacity type). In this case, the charge control for the main batteries (M-BATA and M-BATB) 31L and 31R is performed on the basis of the setup data (charge control parameter) under the control of the power control CPU 306. In order to arbitrarily use the battery packs having two different current capacities, charge control must be performed on the basis of the setup data (charge control parameter) corresponding to the capacity types of the mounted battery packs. In this embodiment, the battery high capacity switch 304 is operated to set a capacity type of a mounted battery pack as the battery pack semi-fixed by a screw, i.e., the left main battery (M-BATA) 31L in accordance with the capacity type of the mounted battery pack. A setup data (charge control parameter) switching processing means of the power control CPU 306 on the basis of the battery high capacity switch 304 is shown in the flow chart of FIG. 8. The capacity type of the mounted battery pack is automatically detected and the setup data (charge control parameter) is automatically switched for the battery pack arbitrarily detachable by the sliding mounting means, i.e., the right main battery (M-BATB) 31R. More specifically, in the battery pack used as the right main battery (M-BATB) 31R, a switch operation projection 70 is formed at a distal end portion at a predetermined position in a mounting direction (i.e., a direction of an arrow in FIG. 7B) in the 1700-mA low-capacity type battery pack. When the battery pack is mounted in the apparatus main body (PC main body), the switch 304 is turned on by the projection 70. The power control CPU 306 determines the capacity type of the mounted battery pack on the basis of the ON signal from the switch 304. The power control CPU 306 performs charge current control of the battery pack as the right main battery (M-BATB) 31R by using setup data (charge control parameter) corresponding to the detected capacity type.

This charge current control will be described with reference to FIG. 9.

FIG. 9 is a block diagram showing the PC-CPU 306 shown in FIG. 2 and its peripheral circuits.

As shown in FIG. 9, the battery 31R (31L) comprising a battery unit consisting of a plurality of primary or secondary batteries supplies a drive power to a load of electronic equipment through a control circuit 306C. Voltage and current values of the power supplied from the battery 31R (31L) to the load are measured by a measuring circuit 103. The measured data are converted into digital data by the A/D converter 306B, and the digital data is supplied to a microcomputer 306a. The battery 31R (31L) comprises a battery detector 107 for detecting a primary battery, a secondary battery, or their high-capacity batteries. When the battery 31R (31L) is mounted in a battery storage section (not shown) of the electronic equipment, the battery detector 107 cooperates with a battery determination section 105 located in the battery storage section opposite to the battery detector 107. A battery determination signal is supplied to the microcomputer 306a. The battery detector 107 comprises the projection shown in FIG. 7B and the switch 304 shown in FIG. 2.

The power can be supplied to the load of the electronic equipment from the AC adapter 29 in addition to the battery 31R (31L). When the AC adapter 29 is connected to the main body, a drive power is supplied from the AC adapter 29 to the load through the control circuit 306C. In this case, the drive power is not supplied from the battery 31R (31L) to the load. When the secondary battery is mounted as the battery 31R (31L), the charge power is supplied from the AC adapter 29 to the battery 31R (31L) through the control circuit 306C. When the battery 31R (31L) comprises a primary battery, no charge current is supplied.

A memory 306e including, e.g., a ROM is connected to the microcomputer 306a. The memory 306e stores battery characteristics including all types of batteries which can be used as batteries for driving the electronic equipment, and the charge and discharge voltage/current characteristics. These battery characteristics are exemplified as a characteristic A as of the primary battery and a characteristic B as of the secondary battery. When a battery determination signal is input from the battery determination section 105 to the microcomputer 306a, a battery characteristic corresponding to the battery determination signal is output from the memory 306e to the microcomputer 306a. On the basis of the battery characteristic value corresponding to the battery determination signal and the measurement data input from the measuring circuit 103, the microcomputer 306a supplies a control signal for controlling a charge current of the battery 31 by the AC adapter 8 through a D/A converter 306d. When the remaining capacity of the battery 31R (31L) is low (i.e., a low-battery state), the microcomputer 306a generates an alarm to a user for electronic equipment by means of an alarm 107 consisting of display equipment. A low-battery detection method and a charge control method are described in U.S. Ser. No. 545,542 filed by the present assignee and entitled as "LOW-BATTERY STATE DETECTING SYSTEM AND METHOD FOR DETECTING THE RESIDUAL CAPACITY OF A BATTERY FROM THE VARIATION IN BATTERY VOLTAGE" (filing date: Jun. 29, 1990, Inventor: Ryozi Ninomiya) and U.S. Ser. No. 578,225 filed by the present assignee and entitled as "METHOD AND APPARATUS FOR BATTERY CONTROL" (filing date: Sep. 6, 1990, inventor: Ryozi Ninomiya).

When the primary battery is mounted in the battery storage section of the electronic equipment, the voltage and current of the power supplied from the battery 31R (31L) to the load are measured by the measuring circuit 103. The measurement data are input to the microcomputer 306a. When the battery determination signal representing the primary battery and obtained by cooperation of the battery detector 107 and the battery determination section 105 is input to the microcomputer 306a, the microcomputer 306a reads out the characteristic A as the primary battery characteristic value from the memory 306e. The microcomputer 306a determines the remaining capacity of the battery A on the basis of the measurement data and the characteristic A. When the remaining capacity is low and reaches, e.g., 95% of the use range, the alarm unit 107 alarms to indicate that a timing for replacing the battery 31R (31L) due to the low remaining capacity to the user. When the battery 31R (31L) is further consumed and reaches the use limit of the battery 31R (31L), an operation error of the electronic equipment may occur. In order to stop supply of power from the battery 31R (31L) to the load, a control signal for stopping discharge of the battery 31R (31L) is supplied from the microcomputer 306a to the control circuit 306c through the D/A converter 306d.

When the AC adapter 29 is connected to the main body, the power is supplied from the AC adapter 29 to the load, but is not supplied from the battery 31R (31L) to the load.

When the secondary battery is mounted as the battery 31R (31L), the characteristic B as the secondary battery characteristic value is read out from the memory 306e, and the operation is the same as the case wherein the primary battery is mounted. However, when the AC adapter 29 is connected, the following different operations are performed. That is, since the secondary battery is rechargeable, the AC adapter 29 supplies power to the load and a charge current to the battery 31R (31L). This charge current is controlled by the control signal output from the microcomputer 306a, and a charge current within the range of 0.1 C to 0.5 C (where C is the secondary battery capacity. For example, 1 C for the 1700-mA capacity battery requires an hour to charge it with a charge current of 1.7 A) is selected stepwise in accordance with the remaining capacity of the battery 31R (31L).

With the above arrangement, the battery pack having an arbitrary capacity type (i.e., 2200-mA high-capacity type or 1700-mA low-capacity type) can be used for the battery pack serving as the detachable right main battery (M-BATB) 31R without causing the user to pay attention to the capacity type. As for the semi-fixed left main battery (M-BATA) 31L, the capacity is set by the switch 403 at the time of pack mounting. It is possible to arrange an arbitrary battery capacity corresponding to an application purpose.

FIGS. 10 through 11B are views for explaining a common interface mechanism for the existing 1- and 2-MB memory cards and the new memory cards (4 MB and 8 MB) mounted in place of only the existing memory cards (1 MB and 2 MB). Of the predetermined number of pins (e.g., 40 pins), one power supply pin and one ground pin (two pins) of each of the memory cards (1 MB and 2 MB), and one (Ta) of the omitted pins is assigned to an increase in address of the new memory cards (4 MB and 8 MB), and the remaining pin (Tb) is assigned to the card determination. When a terminal Tb signal (SEL) is set at high level (SEL="1"), a logic gate array for controlling the output of the incremented address (A9: the most significant bits of the 4- and 8-MB cards) is connected to the terminal Ta of the mounted memory card (4-or 8-MB new memory card).

Figure 14A:
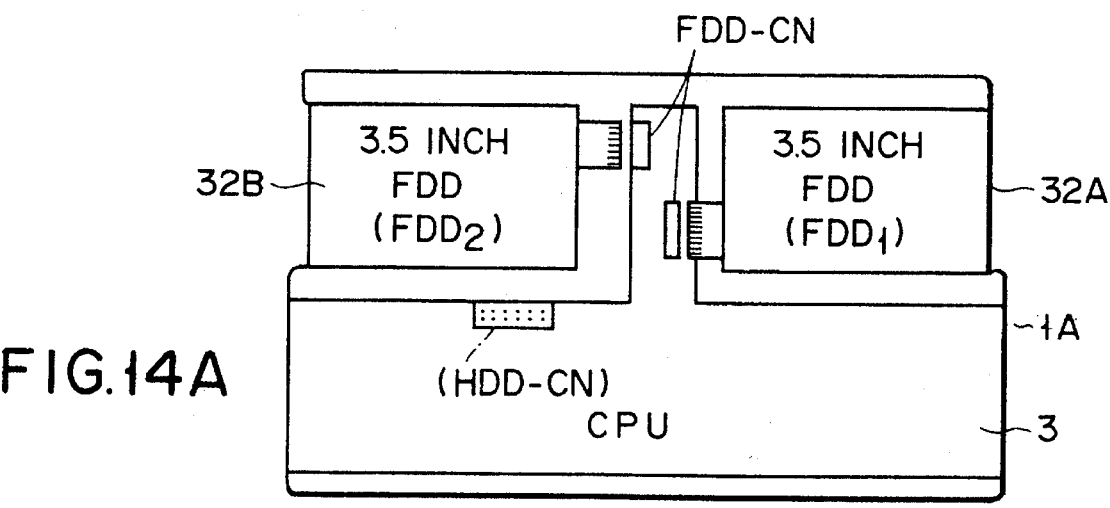
Figure 14B:
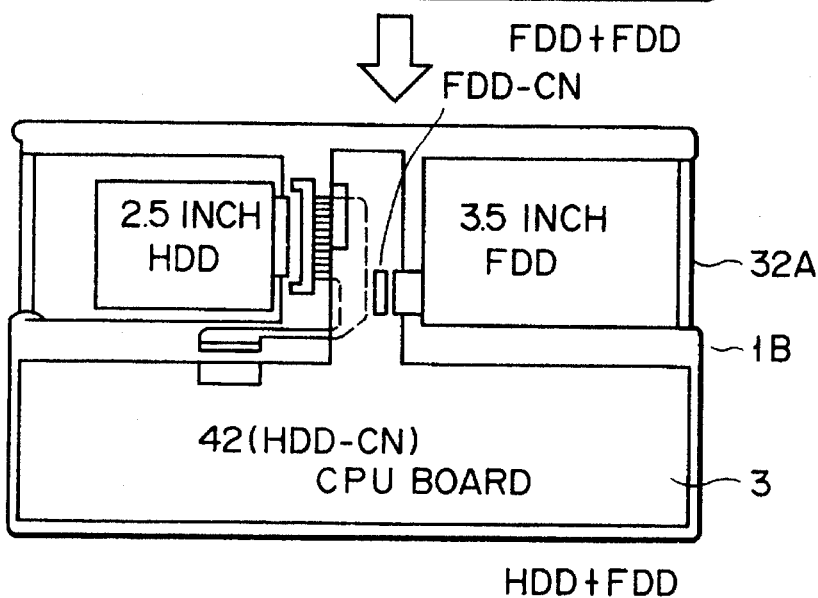
Figure 14C:
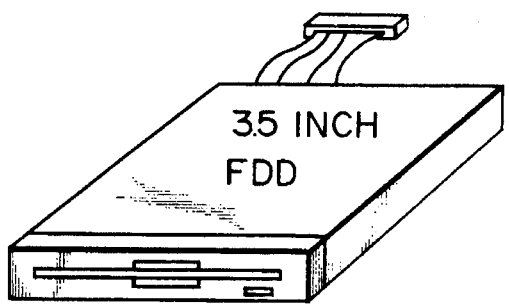
Figure 14D:
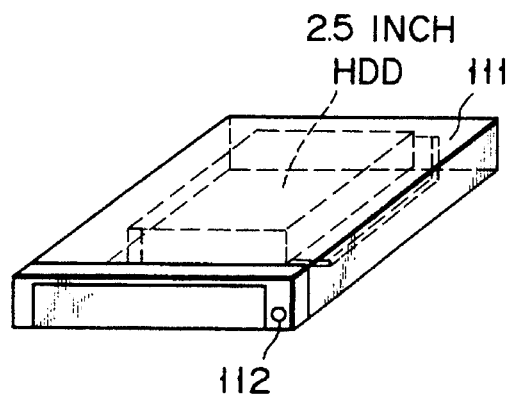

FIGS. 12 through 14D are views for explaining a means for upgrading the system from the FDD+FDD type consisting of the two floppy disk drives (FDD(1) 32A and FDD(2) 32B) to the HDD+FDD type consisting of the 2.5" hard disk (HDD) and the 3.5" floppy disk drive, by using the built-in HDD interface (HDD-IF) 41. A CPU board 3, a keyboard 36, and the like are mounted on the personal computer main body (PC main body). An FDD+FDD type base housing (FIG. 14A) 1A having the two floppy disk drives (FDD(1) 32A and FDD(2) 32B) therein and an HDD+FDD type base housing (FIG. 14B) having the 2.5" hard disk (HDD) and the 3.5" floppy disk drive are prepared. The base housing 1A (FIG. 14A) is replaced with the base housing 1B (FIG. 14B) and the mounted hard disk is connected through a built-in HDD interface (HDD-IF) 41, thereby easily upgrading the system to the HDD+FDD type system. In this case, as shown in FIGS. 14C and 14D, the 2.5" hard disk (HDD) is housed in the same type of housing as that of the 3.5" floppy disk drive and is placed on a detachable tray 111. Upon operation of an eject button 112, the 2.5" hard disk can be placed on the detachable tray 111 or ejected therefrom. Details of this operation will be omitted.

FIG. 15 is a view showing a pop-up menu for a battery state display. In this embodiment, upon simultaneously depressing a specific key such as a function key and an escape key, a battery state is displayed on part of the screen. In this case, in display areas (<LEFT>E••F and <RIGHT>E••F) for the left and right main batteries (M-BATA and M-BATB) 31L and 31R, when the batteries are not mounted, "N/A" is displayed. A battery mounted state (i.e., a state prior to charging) is displayed as "???". When charging of the battery is started, the present battery capacity is displayed with triangular marks (a maximum of seven triangle marks) in place of the battery mounted state "???".

An operation of the embodiment having the above arrangement according to the present invention will be described with reference to FIGS. 1 through 15.

The power control CPU 306 in the power supply circuit 30 always monitors the operating state of the power switch 301. That is, the power control CPU 306 performs the power supply control processing routine regardless of the ON/OFF sate of the power supply of the apparatus. In an operation using the AC adapter (in a power ON state), the power control CPU 306 performs a charge control routine (FIG. 3) including charge processing using the charge control data (charge control parameter) based on setup at the battery high capacity switch 304. In a battery-driven state wherein the AC adapter is not connected, a power ON processing routine shown in FIGS. 4A and 4B is performed.

In the power off state of the apparatus, when the power switch 301 is operated, its switching state is held in the parallel I/O port 305. This state is fetched at a predetermined processing timing by the power control CPU 306, thereby detecting that the power switch 301 has been operated. In this case, the operation of the power switch 301 is detected every period, and a counter is updated every cycle. When the updated count reaches a predetermined value, the power control CPU 306 determines that the power switch 301 is turned on to power the apparatus.

An operation (power ON state) using the AC adapter will be performed in accordance with the charge control routine shown in FIG. 3.

In this case, an external operation power (DC-IN) is supplied from the AC adapter 29 to the apparatus. This external power supply state is determined by the power control CPU 306 through the A/D converter 318 and the internal bus 307 and is detected by the power control CPU 306. Under the control of the power control CPU 306, the AC adapter connecting state display LED (L4) in the state display unit 50 emits red light through the parallel I/O port 305 and the I/O driver 308, thereby displaying an effective connecting state of the AC adapter 29 by means of the LED (L4) (step S1 in FIG. 3; FIG. 5B).

When an external operating power is supplied from the AC adapter 29, it is determined whether the right main battery (M-BATB) 31R is mounted (step S1 in FIG. 3). If YES in step S1 in FIG. 3, the main battery switch (SL1) 309 is turned off, and the main battery switch (SR1) 310a is turned on. The charge unit 311 is controlled to charge the right main battery (M-BATB) 31R (step S3 in FIG. 3).

In this case, the state display LED (L3) for the right main battery (M-BATB) 31R is emits yellow red+green) light, thereby indicating that the right main battery (M-BATB) 31R is being charged (step S4 in FIG. 3; FIG. 5B).

When the right main battery (M-BATB) 31R is fully charged by the above charge control and this full charged state is detected (step S5 in FIG. 3), the state display LED (L3) for the right main battery (M-BATB) 31R emits green light (red OFF/green ON). The LED (L3) indicates that charging of the right main battery (M-BATB) 31R has been completed (step S6 in FIG. 3; FIG. 5B).

When charging of the right main battery (M-BATB) 31R is completed, the main battery switch (SR1) 310a is turned off (step S7 in FIG. 3).

When it is determined that the right main battery (M-BATB) 31R is not mounted in accordance with the mounting state (step S2 in FIG. 3) of the right main battery (M-BATB) 31R, it is then determined whether the left main battery (M-BATA) 31L is mounted (step S8 in FIG. 3). If YES in step S8 in FIG. 3, the main battery switch (SL1) 309 is turned on and the main battery switch (SR1) 310a is turned off. The left main battery (M-BATA) 31L is charged by the charge control of the charge unit 311 (step S9 in FIG. 3).

In this case, the state display LED (L2) for the left main battery (M-BATA) 31L emits yellow (red+green) light. This LED (L2) indicates that the left main battery (M-BATA) 31L is being charged (step S10; FIG. 5B).

During charging of the left main battery (M-BATA) 31L, the power control CPU 306 controls the charging unit 311 on the basis of the setup data (charge control parameter) based on the contents of the battery high capacity switch 304 to charge the left main battery (M-BATA) 31L at high speed in optimal conditions. This processing operation will be described later. By the above charge control, when the left main battery (M-BATA) 31L is fully charged and this full charged state is detected (step S11 in FIG. 3), the state display LED (L2) for the left main battery (M-BATA) 31L emits green light (red OFF/green ON). This LED (L2) indicates that charging of the left main battery (M-BATA) 31L has been completed (step S12 in FIG. 3; FIG. 5B).

When charging of the left main battery (M-BATA) 31L is completed, the main battery switch (SL1) 309 is turned off (step S13 in FIG. 3).

When the external operation power (DC-IN) is supplied from the AC adapter 29, charge control of the left and right main batteries (M-BATA and M-BATB) 31L and 31R is performed under the control of the power control CPU 306. Therefore, an optimal charged state can always be maintained.

A power ON processing operation in a battery-driven state (operation performed when the AC adapter is not connected) will be described with reference to FIGS. 4A through 4C.

In the battery-driven state, since the AC adapter 29 is not connected, the AC adapter connecting state display LED (L4) is kept off (FIGS. 6b and 6C).

In this routine, it is determined whether the power switch 301 has been depressed for a predetermined period of time (step S20 in FIG. 4A). If YES in step S20, it is determined whether the apparatus main body is currently set in a power ON state.

If YES (i.e., power ON state) in step S22 in FIG. 4A), a power OFF routine (not shown) is performed.

If a power OFF state is determined, it is determined whether the left main battery (M-BATA) 31L is set in a power voltage state enough to maintain a normal state (step S23 in FIG. 4A). If YES in step S23 in FIG. 4A, the LED (L4) is turned off (step S26 in FIG. 4A). It is determined whether the power ON operation is started by one of the left and right main batteries (M-BATA and M-BATB) 31L and 31R (step S27 in FIG. 4A).

In this state, since the left main battery (M-BATA) 31L is set in the power voltage state enough to maintain the normal operation, this battery power is supplied to the DC-DC converter 315. The respective operating powers are generated by the DC-DC converter 315 on the basis of the input battery power (power ON by the left main battery (M-BATA) 31L).

In the operation decision step (step S20 in FIG. 4A) for the power switch 301, when it is determined that the power switch 301 has not been depressed for the predetermined period of time, it is determined whether the power ON state is currently set (step S21 in FIG. 4A). If YES (power ON state) in step S21 in FIG. 4A, it is determined whether the left main battery (M-BATA) 31L is set in a power supply voltage state enough to maintain a normal operation (step S23 in FIG. 4A). If YES in step S23 in FIG. 4A, the LED (L4) is turned off (step S26 in FIG. 4A), and it is determined whether the power ON operation is started by one of the left and right main batteries (M-BATA and M-BATB) 31L and 31R (step S27 in FIG. 4A).

In the power supply voltage state check for the left main battery (M-BATA) 31L (step S23 in FIG. 4A), it is determined that the power supply voltage state cannot maintain a normal operation by the left main battery (M-BATA) 31L, i.e., the low-battery state is determined, it is determined whether the right main battery (M-BATB) 31R is set in a power supply voltage state enough to maintain the normal operation (step S24 in FIG. 4A). If YES in step S24 in FIG. 4A, the main battery switch (SR0) 310b is turned on (step S25 in FIG. 4A), and the LED (L4) is turned off (step S26 in FIG. 4A). It is determined whether the power ON operation is started by one of the left and right main batteries (M-BATA and M-BATB) 31L and 31R (step S27 in FIG. 4A).

In this case, since the main battery switch (SR0) 310b is turned on, the power of the right main battery (M-BATB) 31R is supplied to the DC-DC converter 315. The DC-DC converter 315 generates the respective operating powers on the basis of the input battery power. In this case, the reverse flow preventive diode 313 prevents a flow of the power from the right main battery (M-BATB) 31R to the left main battery (M-BATA) 31L.

In the decision step of the power ON battery (step S27 in FIG. 4A), it is determined that the power ON operation is started by the left main battery (M-BATA) 31L, the state display LED (L2) for the left main battery (M-BATA) 31L emits green light (red OFF/green ON). This LED (L2) indicates that the left main battery (M-BATA) 31L is selected and being used (step S28 in FIG. 4A; FIG. 6B). It is determined whether the left main battery (M-BATA) 31L is set in a low-battery state (step S29 in FIG. 4B). If YES in step S29 in FIG. 4B, it is determined whether the right main battery (M-BATA) 31R is mounted (step S30 in FIG. 4B).

If the right main battery (M-BATB) 31R is mounted, it is determined whether this battery has a power supply voltage state enough to maintain a normal operation (step S31 in FIG. 4B). If YES in step S31 in FIG. 4B, the main battery switch (SR0) 310b is turned on. The power from the right main battery (M-BATB) 31R is supplied to the DC-DC converter 315. The DC-DC converter 315 generates the respective operating powers on the basis of the input battery power (step S32 in FIG. 4B).

In this case, the state display LED (L2) for the left main battery (M-BATA) 31L is turned off to stop emitting red light (red ON/green OFF). The LED (L2) indicates that the left main battery (M-BATA) 31L is set in a low-battery state which requires charging (step S33 in FIG. 4B; FIG. 5C). The state display LED (L3) for the right main battery (M-BATB) 31R emits green light (red OFF/green ON). This LED (L3) indicates that the right main battery (M-BATB) 31R is selected and being used (step S34 in FIG. 4B; FIG. 6B).

In the decision step (step S30 in FIG. 4B) for the presence/absence of the right main battery (M-BATB) 31R, when it is determined that the right main battery (M-BATB) 31R is not mounted, or in the decision step (step S31 in FIG. 4B) for the right main battery (M-BATB) 31R, when the right main battery (M-BATB) 31R is set in a low-battery state which requires charging, the state display LED (L2) for the left main battery (M-BATA) 31L flickers red light (red flicker/green OFF). The LED (L2) indicates that the left main battery (M-BATA) 31L is set in the low-battery state which requires charging and at the same time that driving using the battery is impossible (step S39 in FIG. 4B; FIG. 5C).

In the power ON battery discrimination (step S27 in FIG. 4A), it is determined that the right main battery (M-BATB) 31R is selected and being used, the state display LED (L3) for the right main battery (M-BATB) 31R emits green light (red OFF/green ON). This LED (L3) indicates that the right main battery (M-BATB) 31R is selected and being used (step S34 in FIG. 4B; FIG. 6B). It is determined whether the right main battery (M-BATB) 31R is set in a low-battery state (step S35 in FIG. 4B).

When the right main battery (M-BATB) 31R is set in the low-battery state, the absence of the left main battery (M-BATA) 31L is determined (step S36 in FIG. 4B). If the left main battery (M-BATA) 31L is mounted, it is determined whether the left main battery (M-BATA) 31L is set in a power supply voltage state enough to maintain a normal operation (step S37 in FIG. 4B).

When the left main battery (M-BATA) 31L is set in the power supply voltage state enough to maintain the normal operation, the state display LED (L2) for the right main battery (M-BATB) 31R emits red light (red ON/green OFF). The LED (L2) indicates that the right main battery (M-BATB) 31R is set in the low-battery state which requires charging (step S38 in FIG. 4B; FIG. 5C). The flow advances to the decision step (step S22 in FIG. 4A) for the power ON state.

In the decision step of determining whether the left main battery (M-BATA) 31L is mounted (step S30 in FIG. 4B), or in the decision step of determining the sate of the left main battery (M-BATA) 31L (step S31 in FIG. 4B), when it is determined that the left main battery (M-BATA) 31L is set in the low-battery state which requires charging, the LED (L3) for the right main battery (M-BATB) 31R flickers red light (red flicker/green OFF. This LED (L3) indicates that the right main battery (M-BATB) 31R is set in the low-battery state which requires charging and that the battery driving cannot be performed (step S40 in FIG. 4B; FIG. 5C).

The state display LED (L2) for the left main battery (M-BATA) 31L, or the state display LED (L3) for the right main battery (M-BATB) 31R flickers red light, a power OFF routine is started after a lapse of a preset time (three minutes in this case).

In a battery-driven state (i.e., an operation performed when the AC adapter is not connected), highly reliable operations driven by the battery can be assured for a long period of time by the power ON processing.

In this embodiment, of the pair of main batteries (M-BATA and M-BATB) 31L and 31R, one main battery is semi-fixed by a screw (in this case, the left main battery (M-BATA) 31L), and the other battery, i.e., the right main battery (M-BATB) 31R is arbitrarily detachable by the sliding mounting means. As shown in FIGS. 7A and 7B, the main batteries (M-BATA and M-BATB) 31L and 31R are constituted by battery packs having different current capacities (in this case, the 2200-mA high-capacity type and the 1700-mA low-capacity type).

In this case, as described above, charge control of the main batteries (M-BATA and M-BATB) 31L and 31R is performed by the power control CPU 306 on the basis of the setup data (charge control parameter). In order to arbitrarily and selectively use the two different types of battery packs, charge current control must be performed on the basis of the setup data (charge control parameter) corresponding to the capacity types of the mounted battery packs.

For this purpose, in this embodiment, the main battery high capacity switch 304 is operated to set a capacity type of the mounted battery pack, i.e., the left main battery (M-BATA) 31L, in accordance with the capacity type of the mounted battery pack. In this case, the setup data (charge control parameter) switching processing means based on the battery high capacity switch 304 is shown in the flow chart of FIG. 8.

In charge control of the left main battery (M-BATA) 31L, the power control CPU 306 reads the content of the battery high capacity switch 304. The power control CPU 306 determines in accordance with the content whether the current capacity of the semi-fixed mounted battery pack is the 2200-mA high-capacity type or the 1700-mA low-capacity type and controls the charge unit 311 on the basis of the charge control setup data (charge control parameter) corresponding to the determined capacity type, thereby charging the left main battery (M-BATA) 31L at high speed in optimal conditions.

As for the battery pack detachable by the sliding mounting means, i.e., as for the right main battery (M-BATB) 31R, the capacity type of the mounted battery pack is automatically detected and the setup data (charge control parameter) can be automatically switched. That is, in the battery pack used as the right main battery (M-BATB) 31R, the switch operation projection 70 is mounted at the distal end portion at the predetermined position in the mounting direction (i.e., a direction of an arrow in FIG. 7B) in the 1700-mA low-capacity battery pack. A current capacity detection switch 71 operated by the projection 70 is mounted in the apparatus main body (PC main body). The power control CPU 306 detects the capacity type of the mounted battery pack on the basis of the signal from the switch 71 and performs charge control of the battery pack as the right main battery (M-BATB) 31R by using the setup data (charge control data) corresponding to the capacity type.

With this arrangement, the battery pack having any capacity type (2200-mA high-capacity type or 1700-mA low-capacity type) for the detachable right main battery (M-BATB) 31R without causing the operator to pay attention to the capacity type. The battery high capacity switch 403 is once operated at the time of mounting of the pack as the left main battery (M-BATA) 31L. Therefore, any battery capacity configuration corresponding to an application purpose can be easily obtained.

In this embodiment, there is provided a function of displaying mounted states of the main batteries (M-BATA and M-BATB) 31L and 31R and their capacities (remaining capacities) in a pop-up menu shown in FIG. 15. Under the control of the power control CPU 306, in the display areas (<LEFT>E••F and <RIGHT>E••F), a battery nonmounted state is indicated by "N/A", a state in which a battery is mounted but not charged is indicated by "???". When battery charging is started, a present battery capacity is indicated with triangular marks (a maximum of seven triangular marks) in place of the battery mounted state "???".

The mounted states and capacities (remaining capacities) of the pair of left and right main batteries (M-BATA and M-BATB) 31L and 31R can be easily checked by the pop-up menu.

In this embodiment, the 4- and 8-MB new memory cards can be mounted in addition to the 1- and 2-MB existing memory cards as the extension RAM 18. A common interface mechanism for the existing memory cards (1 MB and 2 MB) and the new memory cards (4 MB and 8 MB) is shown in FIGS. 10, 11A, and 11B. Of the predetermined number of pins (e.g., 40 pins), one power supply pin and one ground pin (two pins) of each of the memory cards (1 MB and 2 MB), and one (Ta) of the omitted pins is assigned to an increase in address of the new memory cards (4 MB and 8 MB), and the remaining pin (Tb) is assigned to the card determination. When a terminal Tb signal (SEL) is set at high level (SEL="1"), a logic gate array for controlling the output of the incremented address (A9: the most significant bits of the 4- and 8-MB cards) is connected to the terminal Ta of the mounted memory card (4- or 8-MB new memory card).

The 4- and 8-MB new memory cards can be used in addition to the 1- and 2-MB existing memory cards as the extension RAM 18, thereby easily and arbitrarily increasing the memory capacity.

In this embodiment, the system has the built-in HDD interface (HDD-IF) 41 and can be upgraded from the FDD+FDD type having two floppy disk drives (FDD(1) 32A and FDD(2) 32B) into the HDD+FDD type having one 2.5" hard disk (HDD) and one 3.5" floppy disk drive by using this interface (HDD-IF) 41. More specifically, as shown in FIGS. 12 to 14C, the FDD+FDD type base housing (FIG. 14A) 1A having the two floppy disk drives (FDD(1) 32A and FDD(2) 32B) therein and the HDD+FDD type base housing (FIG. 14B) having the 2.5" hard disk (HDD) and the 3.5" floppy disk drive are prepared. The base housing 1A (FIG. 14A) is replaced with the base housing 1B (FIG. 14B), and the mounted hard disk is connected through a built-in HDD interface (HDD-IF) 41, thereby easily upgrading the system to the HDD+FDD type system. In this case, as shown in FIGS. 14C and 14D, the 2.5" hard disk (HDD) is housed in the same type of housing as that of the 3.5" floppy disk drive and is placed on the detachable tray 111. Upon operation of an eject button 112, the 2.5" hard disk can be placed on the detachable tray 111 or ejected therefrom. Details of this operation will be omitted.

In the above embodiment, when the apparatus is set in the power OFF state, the power control CPU always monitors the operating state of the power switch 301 and the states of the power supplies and the apparatus and externally display the states of the power supplies and the apparatus in the power OFF routine. More specifically, in the power ON routine, when an extension board is not connected to an extension connector 40 or when the extension board connected to the extension connector 40 is confirmed not to be set in a ready state, the power ON processing is executed. A power supply state is determined in the same manner as in the power ON routine, the states of the respective components of the apparatus are determined, and these operations are repeated. During this repetition, when an abnormal sate of the power supply is detected, data which instructs to turn off the power supply is sent to the main CPU 11, and then power OFF processing is executed. In this power OFF processing, the respective power supplies in the apparatus except for the backup power (VBK) are cut off in a predetermined order upon reception of a response from the main CPU 11. The power OFF routine is then initiated. In this case, when the main CPU 11 receives the data which instructs to cut off the power supplies from the power control CPU 306 through the power supply control interface 28, the main CPU 11 recognizes the setup state of the resume function. When the resume function is set, resume processing using the backup RAM 19 is completed, and then response data is sent back to the power control CPU 306 through the power supply control interface 28.

The power control CPU 306 executes the power supply processing routine including charge control of the main batteries (M-BATA and M-BATB) 31L and 31R and the use state control. The power control CPU 306 always monitors the states of the power supplies including the main batteries (M-BATA and M-BATB) 31L and 31R and the apparatus power supply and externally displays their states.

The power control means according to the present invention is not limited to the system configuration shown in FIG. 1 but can be easily applied to another system configuration. The arrangement of the power supply circuit 30 is not limited to that of the above embodiment but may be constituted by another arrangement as a means for recognizing the states of the main batteries (M-BATA and M-BATB) 31L and 31R. In the above embodiment, the external operating power is not supplied. When the first and second main batteries are set in a rechargeable discharge limit state, the means for alarming this state by means of LEDs is exemplified. However, alarming may be performed by a combination of a visual display and a sound.

Additional advantages and modifications will readily occur to those skilled in the art. Therefore, the invention in its broader aspects is not limited to the specific details, and representative devices, shown and described herein. Accordingly, various modifications may be made without departing from the spirit or scope of the general inventive concept as defined by the appended claims and their equivalents.

What is claimed is:

1. A portable computer system having a plurality of battery packs, each of said battery packs having one of a low current capacity and a high current capacity, said system comprising:

battery pack storage means for storing one of said plurality of battery packs;

determining means connected to the stored battery pack for determining if the stored battery pack is designated as a low current capacity pack or a high current capacity pack and for obtaining a determined designated current capacity based on the determination;

power detecting means connected to the stored battery pack and for detecting a power level output from the stored battery pack of a determined designated current capacity and for obtaining a detected power level based on the detection;

memory means connected to the means for determining and the power detecting means for storing characteristic data which is predetermined in accordance with current capacities and power levels of the stored battery pack of a determined designated current capacity;

reading means connected to the memory means, the determining means and the power detecting means for reading out the characteristic data corresponding to the determined designated current capacity and the detected power levels from the memory means as read out data; and charging means connected to the reading means and the stored battery pack for charging the stored battery pack of determined designated current capacity in accordance with said read out data.

2. The portable computer system according to claim 1, wherein at least one stored battery pack of a determined designated current capacity is detachable from the battery pack storage means.

3. (Once amended) The portable computer system according to claim 1, the determining means comprising switching means operating when a battery pack is stored in the battery pack storage means to determine the designated current capacity of said stored battery pack.

4. The portable computer system of claim 1, the system further comprising:

indicator means connected to the charging means for outputting a first indicator when the stored battery is suitable for charging, for outputting a second indicator when the stored battery is fast charging, and for outputting a third indicator when the battery is fully charged.

5. The portable computer system of claim 1, wherein the detected power level output from the stored battery pack is an output voltage.

6. A portable computer system having a plurality of battery packs, each of the battery packs being designated as having one of a low current capacity and a high current capacity, the system comprising:

AC power supply means for converting AC power supply input from an external portion of the computer system into operating power for the computer system and for providing the operating power at a power supply output;

battery pack storage means for storing one of the battery packs;

determining means connected to the stored battery pack for determining if the stored battery pack is designated as having a low current capacity or a high current capacity and for obtaining a determined current capacity based on the determination;

power detecting means connected to the stored battery pack for detecting a power level output from the stored battery pack and for obtaining a selected power level based on the detection;

memory means connected to the determining means and the power detecting means for storing characteristic data which is predetermined in accordance with designated current capacities and power levels of the battery packs;

reading means connected to the memory means, the determining means and the power detecting means for reading out characteristic data corresponding to the determined designated current capacity and the detected power level from the memory means as read out data;

charging means connected to the reading means and the stored battery pack for generating a signal based on the read out data; and selecting means responsive to the charging signal for switching the AC power supply means to the stored battery pack to charge the battery pack.

7. The portable computer system according to claim 6, the determining means comprising switching means operating when one of the plurality of battery packs is stored in the battery pack storage means to determine the designated current capacity for the stored battery pack.

8. The portable computer system of claim 6 further comprising:

operating means for periodically operating the system every 64 msec when the Ac power supply means is connected to a source of AC power.

9. The portable computer system of claim 6, wherein the detected power level output from the stored battery pack is an output voltage.

10. A portable computer system, comprising:

a first rechargeable battery pack having a first designated current capacity;

a second rechargeable battery pack having a second designated current capacity, the second designated current capacity being different from the first designated current capacity;

a computer body including a pack storage portion for selectably storing one of the first and the second battery packs, said first and second batteries being removable from said computer body;

detecting means connected to said stored battery pack for detecting which of the first and second battery packs are stored in the computer body, the detecting means obtaining a first designated current capacity when the detecting means detects that the first battery pack is stored in the pack storage portion and obtaining a second designated current capacity when the detecting means detects that the second battery pack is stored in the pack storage portion;

power detecting means for detecting a power level output from the stored battery pack of the detected designated current capacity by said detecting means; and control means for generating and controlling a charge supplied to the stored battery pack in accordance with the first designated current capacity and the detected power level when the detecting means detects that the first battery pack is stored in the pack storage portion and for controlling the charge supplied to the stored battery pack in accordance with the second designated current capacity and the detected power level when the detecting means detects the second battery pack is stored in the pack storage portion.

11. The computer system according to claim 10, wherein:

the second battery pack comprises a switch push projection;

the detecting means comprises a switch disposed to be pushed by the switch push projection when the second battery pack is stored in the pack storage portion; and the detecting means is further for detecting that the second battery pack is stored in the pack storage portion when the projection pushes the switch.

12. The computer system according to claim 10, further comprising memory means to the detecting means and the control means for storing first characteristic data for controlling the charge of the first battery pack and second characteristic data for controlling the charge of the second battery pack, reading out one of the first and second characteristic data responsive to the detecting means, and controlling the charge of the stored battery pack in accordance with the read out characteristic data.

13. The portable computer system of claim 10, wherein the detected power level output from the stored battery pack is an output voltage.

14. A portable computer having a plurality of battery packs, each of the battery packs having one of a low current capacity and a high current capacity, the portable computer comprising:

battery pack storage in which one of the plurality of battery packs is disposed;

a monitor cooperating with the stored battery pack to determine if the stored battery pack is designated as a low current capacity pack or a high current capacity pack and to produce a determined designated current capacity based on the determination;

a detector, connected to the stored battery pack, indicating a power level output from the stored battery pack of a determined designated current capacity, the detector obtaining a detected power level based on the detected power level output;

memory, connected to the monitor and the detector, containing characteristic data, the characteristic data being predetermined in accordance with current capacities and power levels of the stored battery pack of the determined designated current capacity;

a reader, connected to the memory, the monitor and the detector, reading out the characteristic data corresponding to the determined designated current capacity and the detected power levels from the memory as read out data; and a charger, connected to the reader and the stored battery pack, charging the stored battery pack of determined designated current capacity in accordance with the read out data.

15. The portable computer system of claim 14, wherein the detected power level output from the stored battery pack is an output voltage.

16. A portable computer having a plurality of battery packs, each of the plurality of battery packs being designated as having one of a low current capacity and a high current capacity, the portable computer comprising:

an AC power supply converting AC power input from an external portion of the portable computer into operating power for the portable computer and providing the operating power at a power supply output;

battery pack storage in which one of the plurality of battery packs is disposed;

a monitor cooperating with the stored battery pack to determine if the stored battery pack has a low current capacity or a high current capacity and to obtain a determined current capacity based on the determination;

a detector, connected to the stored battery pack, indicating a power level output from the stored battery pack and obtaining a selected power level based on the detected power level output;

memory, connected to the monitor and the detector, containing characteristic data, the characteristic data being predetermined in accordance with designated current capacities and power levels of the plurality of battery packs;

a reader, connected to the memory, the monitor and the detector, reading out characteristic data corresponding to the determined designated current capacity and the detected power level from the memory as read out data;

a charger, connected to the reader and the stored battery pack, generating a charging signal based on the read out data; and a selector which switches the AC power supply to the stored battery pack based on the charging signal.

17. The portable computer system of claim 16, wherein the detected power level output from the stored battery pack is an output voltage.

18. A portable computer including a first rechargeable battery pack having a first designated current capacity and a second rechargeable battery pack having a second designated current capacity, the second designated current capacity being different from the first designated current capacity, the portable computer comprising:

a pack storage portion selectably storing one of the first and second battery packs, the first and second battery packs being removable from the pack storage portion;

a first detector, connected to the pack storage portion, for detecting which of the first and second battery packs is stored in the pack storage portion, a first designated current capacity being obtained when the first detector detects the first battery pack in the pack storage portion and a second designated current capacity being obtained when the first detector detects the second battery pack in the pack storage portion;

a second detector for detecting a power level output from the stored battery pack of the designated current capacity detected by said first detector; and a controller generating and controlling a charge supplied to the stored battery pack in accordance with the first designated current capacity and the detected power level when the first detector determines that the first battery pack is stored in the pack storage portion and controlling the charge of the stored battery pack in accordance with the second designated current capacity when the first detector detects the second battery pack is stored in the pack storage portion.

19. The portable computer system of claim 18, wherein the detected power level output from the stored battery pack is an output voltage.

* * * * *